(12) United States Patent
Kim et al.

(10) Patent No.: US 12,536,099 B2
(45) Date of Patent: Jan. 27, 2026

(54) STORAGE DEVICE, OPERATING METHOD OF STORAGE DEVICE, AND OPERATING METHOD OF STORAGE SYSTEM

(71) Applicant: Samsung Electronics Co., Ltd., Suwon-si (KR)

(72) Inventors: Sungjin Kim, Suwon-si (KR); Jeayoung Kwon, Suwon-si (KR); Jaesub Kim, Suwon-si (KR); Yangwoo Roh, Suwon-si (KR); Hongmoon Wang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/901,678

(22) Filed: Sep. 30, 2024

(65) Prior Publication Data
US 2025/0117324 A1    Apr. 10, 2025

(30) Foreign Application Priority Data
Oct. 6, 2023 (KR) .......................... 10-2023-0133684

(51) Int. Cl.
G06F 12/02    (2006.01)
G06F 9/455    (2018.01)

(52) U.S. Cl.
CPC ...... *G06F 12/0246* (2013.01); *G06F 9/45558* (2013.01); *G06F 2009/45583* (2013.01)

(58) Field of Classification Search
CPC ............ G06F 12/0246; G06F 9/45558; G06F 2009/45583; G06F 3/0611; G06F 3/0629;
(Continued)

(56) References Cited

U.S. PATENT DOCUMENTS 7,617,252 B2 * 11/2009 Ibrahim ................. G06F 3/067
9,311,127 B2    4/2016 Graham et al.
(Continued)

FOREIGN PATENT DOCUMENTS

KR    101356223 B1    1/2014
KR    101782342 B1    9/2017
(Continued)

OTHER PUBLICATIONS

Extended European Search Report corresponding to European Application No. 24204321.4 (10 pages) (Jan. 16, 2025).
(Continued)

*Primary Examiner* — Hosain T Alam
*Assistant Examiner* — Zubair Ahmed
(74) *Attorney, Agent, or Firm* — Wolf, Greenfield & Sacks, P.C.

(57) ABSTRACT

Provided is an operating method of a storage system including a host device and a storage device, the operating method including transmitting, from the host device to the storage device, a virtualization configuration acquisition command that indicates a request for a virtualization configuration list that is stored in the storage device, transmitting, by the storage device, the virtualization configuration list to the host device in response to the virtualization configuration acquisition command, transmitting, from the host device to the storage device, a virtualization configuration setting command, and performing, by the storage device, an initialization operation for a plurality of virtual functions of the storage device based on the virtualization configuration list in response to the virtualization configuration setting command.

20 Claims, 14 Drawing Sheets

(58) Field of Classification Search
CPC .... G06F 3/0658; G06F 3/0679; G06F 3/0632; G06F 3/0604; G06F 3/061; G06F 3/0659; G06F 2212/1016
USPC .................................................. 711/103, 102
See application file for complete search history.

(56) References Cited

U.S. PATENT DOCUMENTS

| | | |
|---|---|---|
| 9,389,895 B2 | 7/2016 | Oshins et al. |
| 10,348,624 B2 | 7/2019 | Liu et al. |
| 10,467,037 B2 | 11/2019 | Choi et al. |
| 10,810,122 B2 | 10/2020 | Bhattiprolu et al. |
| 11,301,277 B2 | 4/2022 | Szwed et al. |
| 2009/0182930 A1* | 7/2009 | Taguchi ............... G06F 3/061 711/E12.001 |
| 2013/0159572 A1 | 6/2013 | Graham et al. |
| 2016/0292007 A1 | 10/2016 | Ding et al. |
| 2020/0401751 A1* | 12/2020 | Kachare ............... G06F 13/105 |
| 2021/0200573 A1 | 7/2021 | Cao et al. |
| 2021/0247935 A1* | 8/2021 | Beygi .................. G06F 3/061 |
| 2022/0327081 A1* | 10/2022 | Jeon .................... G06F 13/364 |

FOREIGN PATENT DOCUMENTS

| | | |
|---|---|---|
| KR | 102336443 B1 | 12/2021 |
| KR | 102532099 B1 | 5/2023 |

OTHER PUBLICATIONS

Nvm Express: "NVM Express TM Base Specification—Revision 1.3d" XP093097656, Retrieved from Internet URL: https://nvmexpress.org/wp-content/uploads/NVM-Express-I_3d-2019.03.20-Ratified.pdf, retrieved on Nov. 2, 2023 (Mar. 20, 2019).

* cited by examiner

FIG. 4

| | | | | | VCL |
|---|---|---|---|---|---|
| E1 | VALID | RESOURCE | ONLINE | BINDING | VFID |
| E2 | VALID | RESOURCE | ONLINE | BINDING | VFID |
| E3 | VALID | RESOURCE | ONLINE | BINDING | VFID |
| E4 | VALID | RESOURCE | ONLINE | BINDING | VFID |
| ⋮ | | | | | |
| E128 | VALID | RESOURCE | ONLINE | BINDING | VFID |

STORAGE DEVICE, OPERATING METHOD OF STORAGE DEVICE, AND OPERATING METHOD OF STORAGE SYSTEM

CROSS-REFERENCE TO RELATED APPLICATION

This application is based on and claims priority under 35 U.S.C. § 119 to Korean Patent Application No. 10-2023-0133684, filed on Oct. 6, 2023, in the Korean Intellectual Property Office, the disclosure of which is incorporated by reference herein in its entirety.

BACKGROUND

The inventive concept relates to semiconductor memory, and more particularly, to a storage device, an operating method of a storage device, and an operating method of a storage system.

A semiconductor memory is classified into volatile memory devices such as static random access memory (SRAM) and dynamic RAM (DRAM), where stored data is lost when power supply thereto is cut off, and nonvolatile memory devices such as flash memory devices, phase RAM (PRAM), magnetic RAM (MRAM), resistance RAM (RRAM), and ferroelectric RAM (FeRAM) that maintain stored data even when power supply thereto is cut off.

Flash memory-based mass storage media communicate with external devices using high-speed interfaces. Recently, multi-host storage systems have been developed in which a single storage medium supports multiple hosts or multiple tenants, such as multiple virtual machines. In particular, multi-function technology that allows a single storage medium to operate as multiple devices is being developed. The multi-function technology may include technology that provides multiple physical functions, and single root input output virtualization (SR-IOV) technology that provides multiple physical functions and multiple virtual functions by implementing multiple virtual functions with one physical function. In providing the same number of functions, the SR-IOV technology may reduce implementation costs compared to the multiple physical functions.

SUMMARY

The inventive concept provides a storage device to which configurations for multiple virtual functions are offloaded, an operating method of a storage device, and an operating method of a storage system.

According to some embodiments of the inventive concept, there is provided an operating method of a storage system including a host device and a storage device, the operating method including transmitting, from the host device to the storage device, a virtualization configuration acquisition command that indicates a request for a virtualization configuration list that is stored in the storage device, transmitting, by the storage device, the virtualization configuration list to the host device in response to the virtualization configuration acquisition command, transmitting, from the host device to the storage device, a virtualization configuration setting command, and performing, by the storage device, an initialization operation for a plurality of virtual functions of the storage device based on the virtualization configuration list in response to the virtualization configuration setting command.

According to some embodiments of the inventive concept, there is provided an operating method of a storage device, the operating method including receiving a virtualization configuration setting command from an external host device, and performing, by the storage device, an initialization operation for a plurality of virtual functions of the storage device based on a virtualization configuration list in response to a virtualization configuration setting command. The storage device does not receive commands other than the virtualization configuration setting command from the external host device while performing the initialization operation.

According to some embodiments of the inventive concept, there is provided a storage device including a nonvolatile memory device, and a controller configured to control the nonvolatile memory device and communicate with an external host device through an interface channel, wherein the controller is configured to provide a physical function, and a plurality of virtual functions related to the physical function, a virtualization configuration manager configured to generate a virtualization configuration list of the plurality of virtual functions, store the virtualization configuration list in the nonvolatile memory device, transmit the virtualization configuration list to the external host device in response to a virtualization configuration acquisition command received from the external host device, and transmit the virtualization configuration list to a virtualization manager in response to a virtualization configuration setting command received from the external host device, and a virtualization manager configured to perform an initialization operation for the plurality of virtual functions based on the virtualization configuration list.

BRIEF DESCRIPTION OF THE DRAWINGS

Embodiments will be more clearly understood from the following detailed description taken in conjunction with the accompanying drawings in which:

FIG. 4 is a diagram of a virtualization configuration list according to some embodiments;

DETAILED DESCRIPTION

Hereinafter, embodiments are described clearly and in detail so that a person skilled in the art may easily practice the inventive concept.

Figure 1:
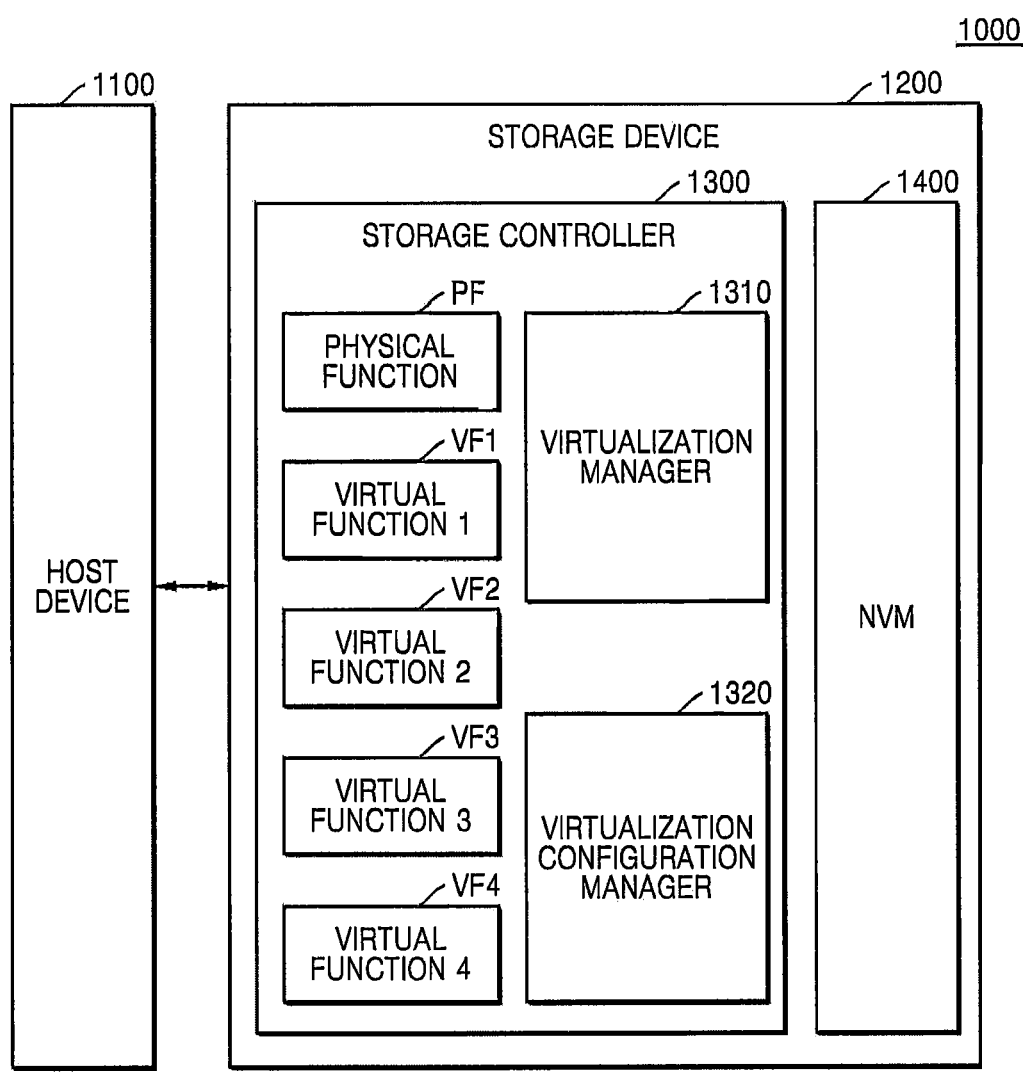
FIG. 1 is a block diagram of a storage system according to some embodiments.

FIG. 1 is a block diagram of a storage system according to some embodiments.

Referring to FIG. 1, a storage system 1000 may include a host device 1100 and a storage device 1200. In some embodiments, the storage system 1000 may be a computing system such as a computer, a laptop, a server, a work station, a portable communication terminal, a personal digital assistant (PDA), a portable media player (PMP), a smartphone, or a wearable device.

The host device 1100 may be configured to control overall operations of the storage system 1000. The host device 1100 may be configured to access the storage device 1200. The host device 1100 may store data in the storage device 1200 or read data stored in the storage device 1200. For example, the host device 1100 may transmit a write command and write data to the storage device 1200 to store data in the storage device 1200. In some embodiments, the host device 1100 may transmit a read command to the storage device 1200 and receive data from the storage device 1200 to read data stored in the storage device 1200.

In some embodiments, the host device 1100 may communicate with the storage device 1200 based on a preset interface. The preset interface may support at least one of various interfaces such as universal serial bus (USB), small computer system interface (SCSI), peripheral component interconnect (PCI) express (PCIe), advanced technology attachment (ATA), parallel ATA (PATA), serial ATA (SATA), serial attached SCSI (SAS), universal flash storage (UFS), nonvolatile memory express (NVMe), compute express link (CXL), and/or the like, but is not limited thereto.

The host device 1100 controls the storage device 1200. The storage device 1200 may be used as a mass storage medium of the storage system 1000. In some embodiments, the storage device 1200 may be a solid state drive (SSD) mounted on the host device 1100. The storage device 1200 may include a non-transitory computer-readable medium.

For example, the storage device 1200 may include a storage controller 1300 and a nonvolatile memory device 1400. The storage controller 1300 may store write data received from the host device 1100 in the nonvolatile memory device 1400 in response to the write command received from the host device 1100. The storage controller 1300 may transmit data read from the nonvolatile memory device 1400 to the host device 1100 in response to the read command received from the host device 1100.

The nonvolatile memory device 1400 may store data or transmit the stored data to the storage controller 1300 under control by the storage controller 1300. In some embodiments, the nonvolatile memory device 1400 may be a NAND flash memory device, but is not limited thereto.

In some embodiments, the host device 1100 may exchange data with the storage device 1200 through an interface channel. For example, the host device 1100 may transmit data to or receive data from the storage device 1200 through the interface channel.

The storage controller 1300 may include a physical function PF, virtual functions VF, a virtualization manager 1310, and a virtualization configuration manager 1320. In some embodiments, the storage controller 1300 may include a physical function PF and first to fourth virtual functions VF1 to VF4, but is not limited thereto. The number of physical functions PF and the number of virtual functions VF may decrease or increase depending on an implementation method. The virtualization manager 1310 may be implemented as software, hardware, or a combination thereof. The virtualization configuration manager 1320 may be implemented as software, hardware, or a combination thereof.

For example, the number of virtual functions that the storage device 1200 can provide may be "4" or more. The number of virtual functions that the storage device 1200 can provide may be "128". It is assumed that the first to fourth virtual functions VF1 to VF4 are operating virtual functions (or online virtual functions, active virtual functions).

For example, the physical function PF and the virtual functions VF may be hardware or software configurations configured to provide functionality defined by the PCIe interface standard. In some embodiments, the physical function PF and virtual functions VF may be PCIe functions that support single root I/O virtualization (SR-IOV). In some embodiments, the physical function PF and the virtual functions VF may be sub-storage controllers. The sub-storage controllers may be implemented as software, hardware, or a combination thereof. For example, the physical function PF may be a primary controller, and the virtual functions VF may be secondary controllers.

The setting of the virtual functions VF1 to VF4 of the SR-IOV is dependent on the physical function PF. When a reset (or function level reset) is applied to the physical function PF, all configuration information of the first to fourth virtual functions VF1 to VF4 generated based on the physical function PF may be reset. That is, the configuration information of the plurality of virtual functions VF may be initialized. Accordingly, after resetting the physical function PF, the host device 1100 may need to re-perform an initialization operation for each of the plurality of virtual functions VF.

The storage device 1200 may store the context of the SR-IOV in the nonvolatile memory device 1400. The storage device 1200 may automatically set the plurality of virtual functions VF based on the context of the SR-IOV stored in the nonvolatile memory device 1400.

The virtualization configuration manager 1320 may provide a stored virtualization configuration list VCL to the host device 1100 upon request from the host device 1100. In some embodiments, the virtualization configuration manager 1320 may store the context of the SR-IOV in the nonvolatile memory device 1400. The virtualization configuration manager 1320 may generate the virtualization configuration list VCL. The virtualization configuration manager 1320 may manage the virtualization configuration list VCL. The virtualization configuration manager 1320 may store the virtualization configuration list VCL in the nonvolatile memory device 1400.

The virtualization configuration list VCL may include a plurality of configuration entries. The configuration entries may include configuration information (or setting information) of corresponding virtual functions. For example, the configuration information may refer to information on each of the plurality of virtual functions VF set by the host device 1100. The configuration information may include resource data, online data, binding data, a virtual function identifier, and valid data. For example, the virtualization configuration manager 1320 may store and manage configuration information (or setting information) of the plurality of virtual functions VF in the nonvolatile memory device 1400.

In some embodiments, the storage device 1200 may store the virtualization configuration list VCL in nonvolatile memory such as EFuse, EEPROM (Electrically Erasable Programmable Read-only Memory), MASKROM, Serial PROM (Serial Programmable Read-only Memory), and flash memory, but is not limited thereto. For example, the virtualization configuration list VCL may be stored in one time programming (OTP) memory, a meta area of the nonvolatile memory device 1400, and serial NOR flash (SNOR).

The virtualization configuration manager 1320 may transmit the virtualization configuration list VCL to the host device 1100 in response to a virtualization configuration acquisition command received from the host device 1100. The virtualization configuration manager 1320 may transmit the virtualization configuration list VCL to the virtualization manager 1310 in response to a virtualization configuration setting command received from the host device 1100.

For example, the virtualization configuration manager 1320 may read the virtualization configuration list VCL stored in the nonvolatile memory device 1400 in response to the virtualization configuration setting command received from the host device 1100. The virtualization configuration manager 1320 may transmit the read virtualization configuration list VCL or part of the virtualization configuration list VCL to the virtualization manager 1310.

The virtualization manager 1310 may perform an initialization operation based on the virtualization configuration list VCL. After the reset, the virtualization manager 1310 may perform an initialization operation for the plurality of virtual functions VF based on the virtualization configuration list VCL stored in the nonvolatile memory device 1400. In response to the virtualization configuration setting command received from the host device 1100, the virtualization configuration manager 1320 may independently set the plurality of virtual functions VF based on the previous virtualization configuration list VCL stored in the nonvolatile memory device 1400.

The virtualization manager 1310 may perform an initialization operation for the plurality of virtual functions VF based on the virtualization configuration list VCL stored in the nonvolatile memory device 1400. The virtualization manager 1310 may perform an automatic setting operation based on the virtualization configuration list VCL received from the virtualization configuration manager 1320 or part of the virtualization configuration list VCL (e.g., at least one of valid data, resource data, online data, binding data, and a virtual function identifier). The automatic setting operation may refer to an operation of performing an initialization operation for the plurality of virtual functions VF based on the virtualization configuration list VCL stored before the reset without intervention of the host device 1100.

The virtualization manager 1310 may perform an initialization operation for the plurality of virtual functions VF independently in response to one virtualization configuration setting command without the control by the host device 1100. For example, the virtualization manager 1310 may allocate resources to the plurality of virtual functions VF based on the virtualization configuration list VCL. The virtualization manager 1310 may perform a function level reset operation based on the virtualization configuration list VCL. The virtualization manager 1310 may perform an online operation for the plurality of virtual functions VF based on the virtualization configuration list VCL. The virtualization manager 1310 may perform a binding operation for the plurality of virtual functions VF based on the virtualization configuration list VCL. The virtualization manager 1310 may perform a namespace attachment operation for the plurality of virtual functions VF based on the virtualization configuration list VCL. The virtualization manager 1310 may set performance information for the plurality of virtual functions VF based on the virtualization configuration list VCL.

As described above, the storage device 1200 according to some embodiments may store the virtualization configuration list VCL that exists in the host device 1100 in the nonvolatile memory device 1400 as well. The storage device 1200 may perform an automatic setting operation (or initialization operation) after the reset based on the virtualization configuration list VCL stored before the reset. The host device 1100 may perform other operations while the storage device 1200 performs an automatic setting operation. The storage device 1200 may support offloading a setting operation for virtual functions from the host device 1100 to the storage device 1200. As the number of communications between the host device 1100 and the storage device 1200 decreases, the time required to perform an initialization operation for the plurality of virtual functions VF may be reduced.

Figure 2:
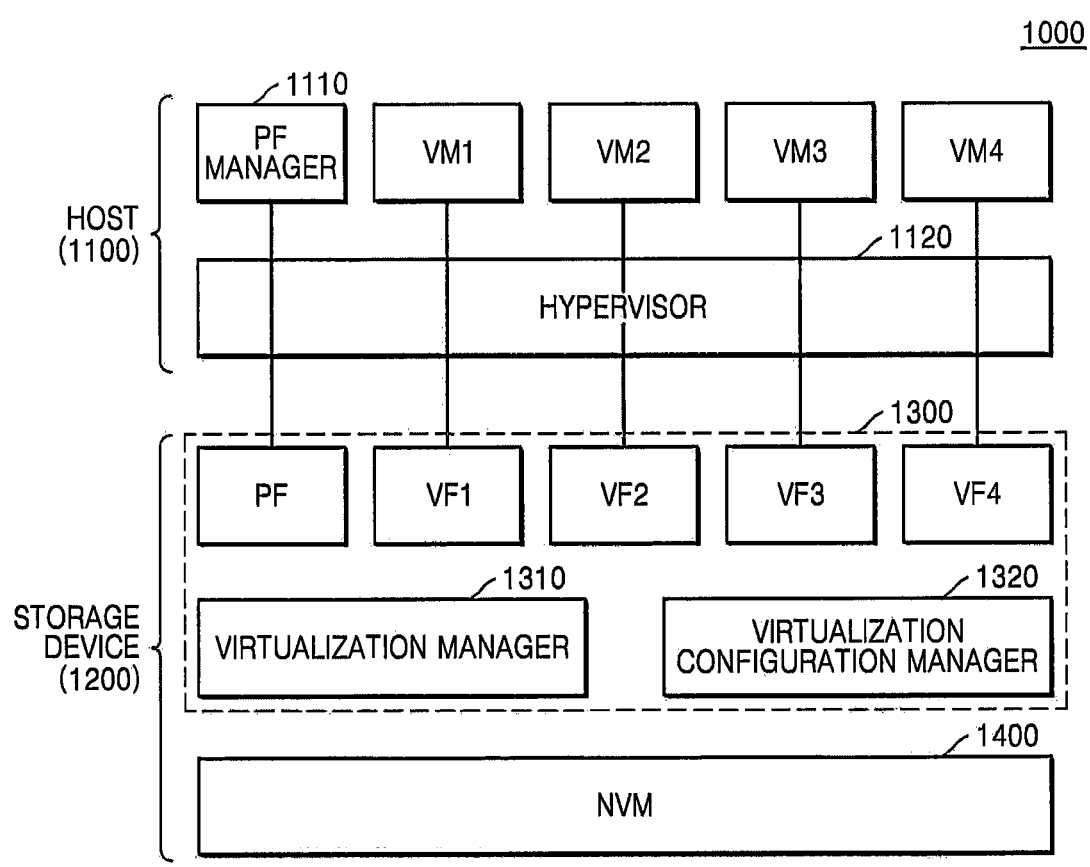
FIG. 2 is a block diagram of a storage system according to some embodiments.

FIG. 2 is a block diagram of a storage system according to some embodiments.

Referring to FIGS. 1 and 2, the host device 1100 may include a PF manager 1110, a hypervisor 1120, and first to fourth virtual machines VM1 to VM4. The storage device 1200 may include the storage controller 1300 and the nonvolatile memory device 1400. The storage controller 1300 may include the physical function PF, the first and fourth virtual functions VF1 to VF4, the virtualization manager 1310, and the virtualization configuration manager 1320. For convenience of explanation, detailed description of the components illustrated in FIG. 1 is omitted.

The host device 1100 may be configured to run a plurality of virtual machines (e.g., first to fourth virtual machines VM1 to VM4). Each of the plurality of virtual machines VM1 to VM4 may run independently on the host device 1100. The hypervisor 1120 may be a logical platform configured to run the plurality of virtual machines VM1 to VM4 running on the host device 1100. Each of the plurality of virtual machines VM1 to VM4 may be run on the host device 1100.

In some embodiments, the PF manager 1110 may communicate with the physical function PF, and the plurality of virtual machines VM1 to VM4 may communicate with the corresponding virtual functions VF1 to VF4. The PF manager 1110 may be a management host. The virtual machines VM1 to VM4 may be user hosts. For example, the PF manager 1110 may transmit a management command to the physical function PF. Each of the virtual machines VM1 to VM4 may transmit a general command to the corresponding virtual function VF1 to VF4.

The physical function PF may receive and process the management command generated by the PF manager 1110 or the general command. Each of the virtual functions VF1 to VF4 may receive and process the general command generated by the corresponding virtual machines VM1 to VM4. A virtual function VF may share physical resources, such as links, with the physical function PF and other virtual functions related to the same physical function PF. The virtual function VF may be a lightweight PCIe function that may be directly accessed by a virtual machine VM.

The PF manager 1110 and each of the plurality of virtual machines VM1 to VM4 may be configured to access the storage device 1200. The first virtual machine VM1 may correspond to the first virtual function VF1, the second virtual machine VM2 may correspond to the second virtual function VF2, the third virtual machine VM3 may correspond to the third virtual function VF3, and the fourth virtual machine VM4 may correspond to the fourth virtual function VF4. In other words, the first virtual machine VM1 may communicate with the first virtual function VF1, the second virtual machine VM2 may communicate with the second virtual function VF2, the third virtual machine VM3 may communicate with the third virtual function VF3, and the fourth virtual machine VM4 may communicate with the fourth virtual function VF4.

For example, the physical function PF may be a sub-storage controller corresponding to the PF manager 1110, and each of the plurality of virtual functions VF may be a sub-storage controller corresponding to at least one of the plurality of virtual machines, but are not limited thereto. In addition, for convenience of explanation, terms such as a physical function PF and a virtual function VF are used, but the physical function PF and the virtual function VF may be used interchangeably with the configuration or terminology of the sub-storage controller.

In some embodiments, the storage device 1200 may support the SR-IOV function. The SR-IOV function may refer to a function in which one physical function supports one or more dependent virtual functions. The storage device 1200 may include the plurality of virtual functions VF and may support multi-functions. For example, it may be understood that the physical function PF and the virtual functions VF are configured to process commands for a corresponding host (e.g., virtual machine), or commands in a transmission queue managed by the corresponding host. Hereinafter, for convenience of explanation, it is assumed that the storage device 1200 communicates with 4 virtual machines VM1 to VM4, but is not limited thereto.

It is assumed that the storage device 1200 supports up to "128" virtual functions. The host device 1100 may set the number of virtual functions to be used through commands. For example, the host device 1100 may set the number of virtual functions for a physical function to "4". The host device 1100 may use only 4 virtual functions out of 128 virtual functions and may not use the remaining virtual functions. Hereinafter, it is assumed that the host device 1100 uses only the first to fourth virtual functions VF1 to VF4.

In some embodiments, the host device 1100 may manage resources (or controller resources) for the virtual functions VF1 to VF4 through NVMe standard virtualization management commands. The host device 1100 may allocate resources to or remove resources from the virtual functions VF1 to VF4 using the virtualization management commands. The host device 1100 may issue the virtualization management commands to the physical function PF and may request the storage device 1200 to allocate resources to the virtual functions VF1 to VF4 related to the physical function PF. For example, the resources may include virtual queue resources (hereinafter referred to as virtual queues) and virtual interrupt resources (hereinafter referred to as virtual interrupts). The virtual queues may be a type of controller resources that manage submission queues and completion queues. The virtual interrupts may be a type of controller resources that manage interrupt vectors.

Figure 3:
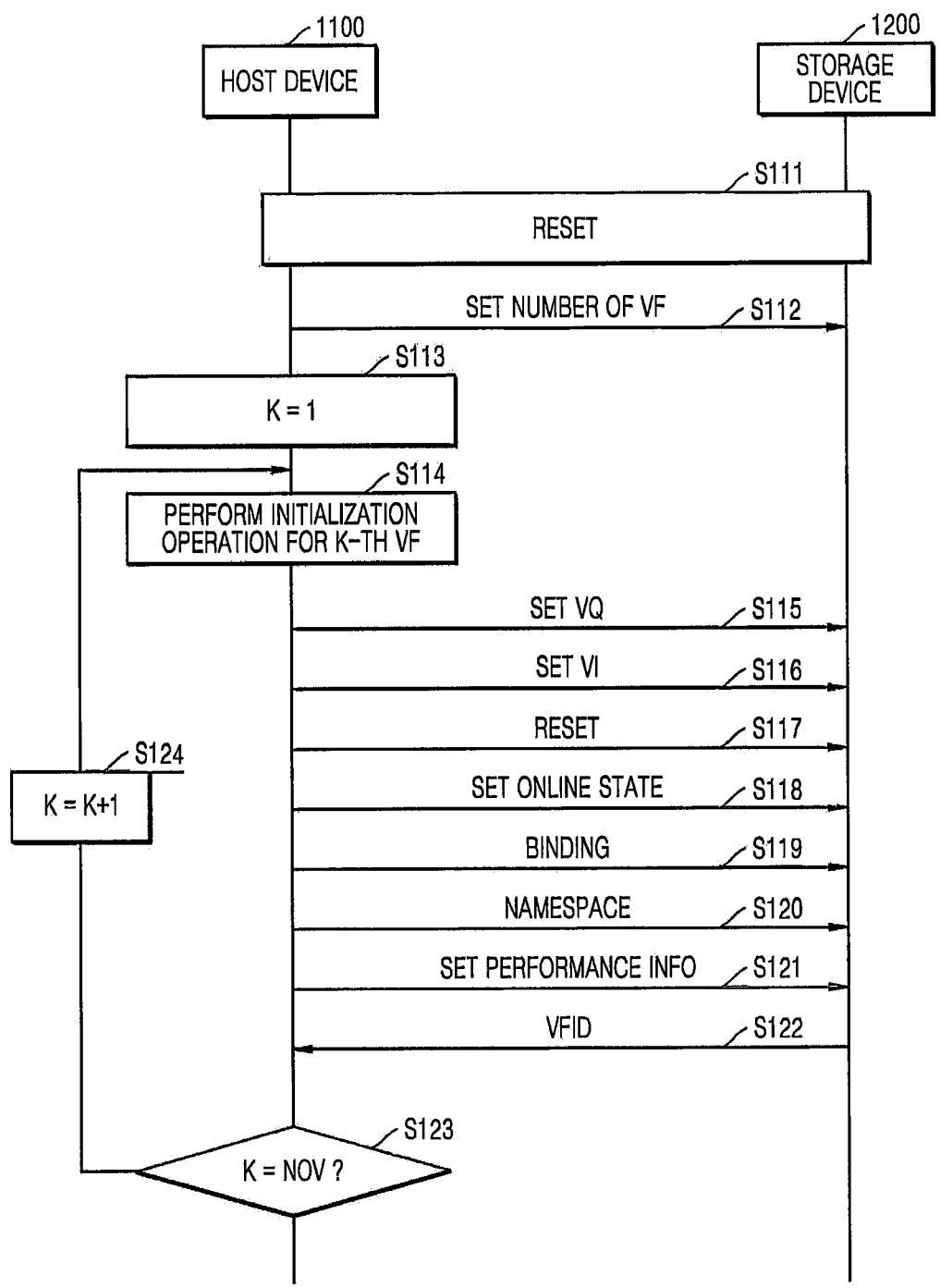
FIG. 3 is a diagram illustrating an operating method of a storage system according to some embodiments.

FIG. 3 is a diagram illustrating an operating method of a storage system according to some embodiments.

Referring to FIGS. 1 and 3, in operation S111, the storage system 1000 may be reset. In some embodiments, the storage system 1000 may be powered up. When the storage system 1000 is reset or powered up, the host device 1100 may transmit information about the start of initialization to the storage device 1200. In response to the information about the start of initialization, the storage device 1200 may perform an initialization operation. For example, the host device 1100 may transmit a reset signal (or reset command) for the physical function PF related to the plurality of virtual functions VF to the storage device 1200. In response to the reset signal, the storage device 1200 may initialize the configuration for the physical function PF and initialize the configuration for the plurality of virtual functions VF.

In operation S112, the host device 1100 may transmit the number of virtual functions to the storage device 1200. The storage device 1200 may transmit device information including information about the maximum number of virtual functions to the host device 1100. The host device 1100 may set the number of virtual functions within the maximum number of virtual functions. The host device 1100 may transmit information about the number of virtual functions to the storage device 1200.

In operation S113, variable K may be set to 1. For example, the variable K is used to describe repetition of an initialization operation for the plurality of virtual functions VF, and does not limit the scope of the inventive concept.

In operation S114, the host device 1100 may perform an initialization operation for a Kth virtual function among the plurality of virtual functions VF. In operation S115, the host device 1100 may set a virtual queue for the Kth virtual function. For example, the host device 1100 may transmit information about a queue corresponding to the Kth virtual function to the storage device 1200. In some embodiments, the host device 1100 may set the virtual queue for the Kth virtual function through the NVMe standard virtualization management command. The virtualization management command may include information about the number of virtual queues. The storage device 1200 may set the virtual queue for the Kth virtual function in response to the virtualization management command.

In operation S116, the host device 1100 may set a virtual interrupt for the Kth virtual function. For example, the host device 1100 may transmit information about an interrupt corresponding to the Kth virtual function to the storage device 1200. In some embodiments, the host device 1100 may set the virtual interrupt for the Kth virtual function through the NVMe standard virtualization management command. The virtualization management command may include information about the number of virtual interrupts. The storage device 1200 may set the virtual interrupt for the Kth virtual function in response to the virtualization management command.

In operation S117, the host device 1100 may transmit a reset signal for the Kth virtual function. For example, the host device 1100 may perform a virtual function level reset for the Kth virtual function. The storage device 1200 may perform a reset operation for the Kth virtual function in response to the reset signal.

In operation S118, the host device 1100 may set a state for the Kth virtual function. The Kth virtual function may have an online or offline state. The host device 1100 may set the Kth virtual function to an online state.

In some embodiments, the host device 1100 may convert the Kth virtual function between an online state and an offline state by using the NVMe standard virtualization management command. For example, the host device 1100 may convert the Kth virtual function from an offline state to an online state through the virtualization management command. In some embodiments, the host device 1100 may convert the Kth virtual function from an online state to an offline state through the virtualization management command.

In some embodiments, the storage device 1200 may receive the virtualization management command including state information of the Kth virtual function. The storage device 1200 may set the Kth virtual function to an online state in response to the virtualization management command.

In operation S119, the host device 1100 may set binding information for the Kth virtual function. For example, the host device 1100 may transmit the binding information for the Kth virtual function to the storage device 1200. The storage device 1200 may bind the Kth virtual function based on the binding information received from the host device 1100. For example, the storage device 1200 may perform binding on the virtual function VF in an online state.

In operation S120, the host device 1100 may attach a namespace to the Kth virtual function. For example, the host device 1100 may transmit namespace information for the Kth virtual function to the storage device 1200. The host device 1100 may attach the Kth virtual function to a corresponding namespace among a plurality of namespaces.

In some embodiments, the host device 1100 may use an NVMe standard namespace attachment command to attach the Kth virtual function to or detach the Kth virtual function from the namespace. For example, the host device 1100 may attach the Kth virtual function to the corresponding namespace through the namespace attachment command. In some embodiments, the host device 1100 may detach the Kth virtual function from the corresponding namespace through the namespace attachment command.

In some embodiments, the storage device 1200 may receive the namespace attachment command from the host device 1100. The storage device 1200 may attach the Kth virtual function to the corresponding namespace in response to the namespace attachment command.

In operation S121, the host device 1100 may set performance information for the Kth virtual function. For example, the host device 1100 may transmit the performance information for the Kth virtual function to the storage device 1200. The storage device 1200 may receive the performance information from the host device 1100. The storage device 1200 may set the performance information for the Kth virtual function based on the received performance information.

In operation S122, the storage device 1200 may transmit a virtual function identifier VFID to the host device 1100. The storage device 1200 may transmit an identifier corresponding to the virtual function to the host device 1100. The virtual function identifier VFID may be unique information for distinguishing each of the plurality of virtual functions VF as the virtual function identifier VFID is assigned to each of the plurality of virtual functions VF. The virtual function identifier VFID may be used in the virtualization configuration acquisition command or the virtualization configuration setting command. The virtual function identifier VFID may be used in the virtualization configuration list VCL.

In operation S123, the host device 1100 may determine whether the variable K is the number of virtual functions NOV. The host device 1100 performs operation S124 when the variable K is not the number of virtual functions NOV. In operation S124, the host device 1100 increases the variable K by 1. Afterwards, the host device 1100 performs operation S114.

In some embodiments, when an initialization operation for virtual functions is completed, the host device 1100 may attach the bound virtual functions VF to virtual machines VM. The virtual machines VM may communicate with the corresponding virtual functions VF, respectively.

As described above, after performing a reset operation for the physical function PF of the storage device 1200, the host device 1100 may perform an initialization operation for the plurality of virtual functions VF related to the physical function PF. To perform an initialization operation for each of the plurality of virtual functions VF, the host device 1100 may perform operations S115 to S121 for each of the plurality of virtual functions VF. For example, to initialize 128 virtual functions, the host device 1100 needs to issue hundreds of NVMe standard commands and PCIe standard register settings.

FIG. 4 is a diagram of a virtualization configuration list VCL according to some embodiments.

For convenience of explanation, it is assumed that the maximum number of virtual functions supported by the storage device 1200 is "128", and the number of virtual functions set by the host device 1100 is "4", but is not limited thereto.

The storage device 1200 may generate and manage the virtualization configuration list VCL. The storage device 1200 may store the virtualization configuration list VCL in the nonvolatile memory device 1400. The storage device 1200 may provide the virtualization configuration list VCL to the host device 1100. The storage device 1200 may automatically perform an initialization operation for the plurality of virtual functions VF based on the virtualization configuration list VCL.

Referring to FIG. 4, the virtualization configuration list VCL may include the plurality of configuration entries. For example, the virtualization configuration list VCL may include first to 128th configuration entries E1 to E128. The number of configuration entries included in the virtualization configuration list VCL may be equal to the maximum number of virtual functions VF. Each of the plurality of configuration entries may include configuration information of a corresponding virtual function among the plurality of virtual functions VF. The configuration entries may include valid data, resource data, online data, binding data, and a virtual function identifier. For example, the first configuration entry E1 may include valid data VALID, resource data RESOURCE, online data ONLINE, binding data BINDING, and a virtual function identifier VFID.

The valid data VALID may be set according to the number of virtual functions set by the host device 1100. The valid data VALID may indicate a valid state or an invalid state. For example, since the number of virtual functions is "4", the valid data VALID of the first to fourth entries E1 to E4 may indicate a valid state. The valid data VALID of the 5th to 128th entries E5 to E128 may indicate an invalid state. That is, among the plurality of configuration entries, the number of configuration entries with valid data indicating a valid state may be equal to the number of virtual functions.

The resource data RESOURCE may include virtual queue data, virtual interrupt data, namespace data, performance data (or performance information), etc. For example, the virtual queue data may indicate the number of virtual queues. The virtual interrupt data may indicate the number of virtual interrupts. The namespace data may indicate a namespace identifier corresponding to a virtual function. The performance data may indicate performance information set by the host device 1100.

The online data ONLINE may indicate a state of the corresponding virtual function. The online data may indicate an online state or an offline state. For example, a virtual function that has an online state may be used by the host device 1100. The virtual function that has an online state may be allocated necessary resources by the virtualization manager 1310. The virtual function that has an online state may be activated. A virtual function that has an offline state may not be used by the host device 1100.

The binding data BINDING may indicate whether the corresponding virtual function is bound. The virtual function identifier VFID may be unique information for distinguishing each of the plurality of virtual functions VF as the virtual function identifier VFID is assigned to each of the plurality of virtual functions VF. For example, the virtual function identifier VFID of the first entry E1 may refer to an identifier of the virtual function (e.g., first virtual function VF1) corresponding to the first entry E1.

As described above, the storage device 1200 may store the virtualization configuration list VCL. The storage device 1200 may independently perform an initialization operation for the plurality of virtual functions VF based on the virtualization configuration list VCL. Accordingly, the number of communications between the host device 1100 and the storage device 1200 may be reduced. An operation of setting the plurality of virtual functions VF may be offloaded from the host device 1100 to the storage device 1200. While the storage device 1200 sets the plurality of virtual functions VF independently, the host device 1100 may perform other operations.

Figure 5:
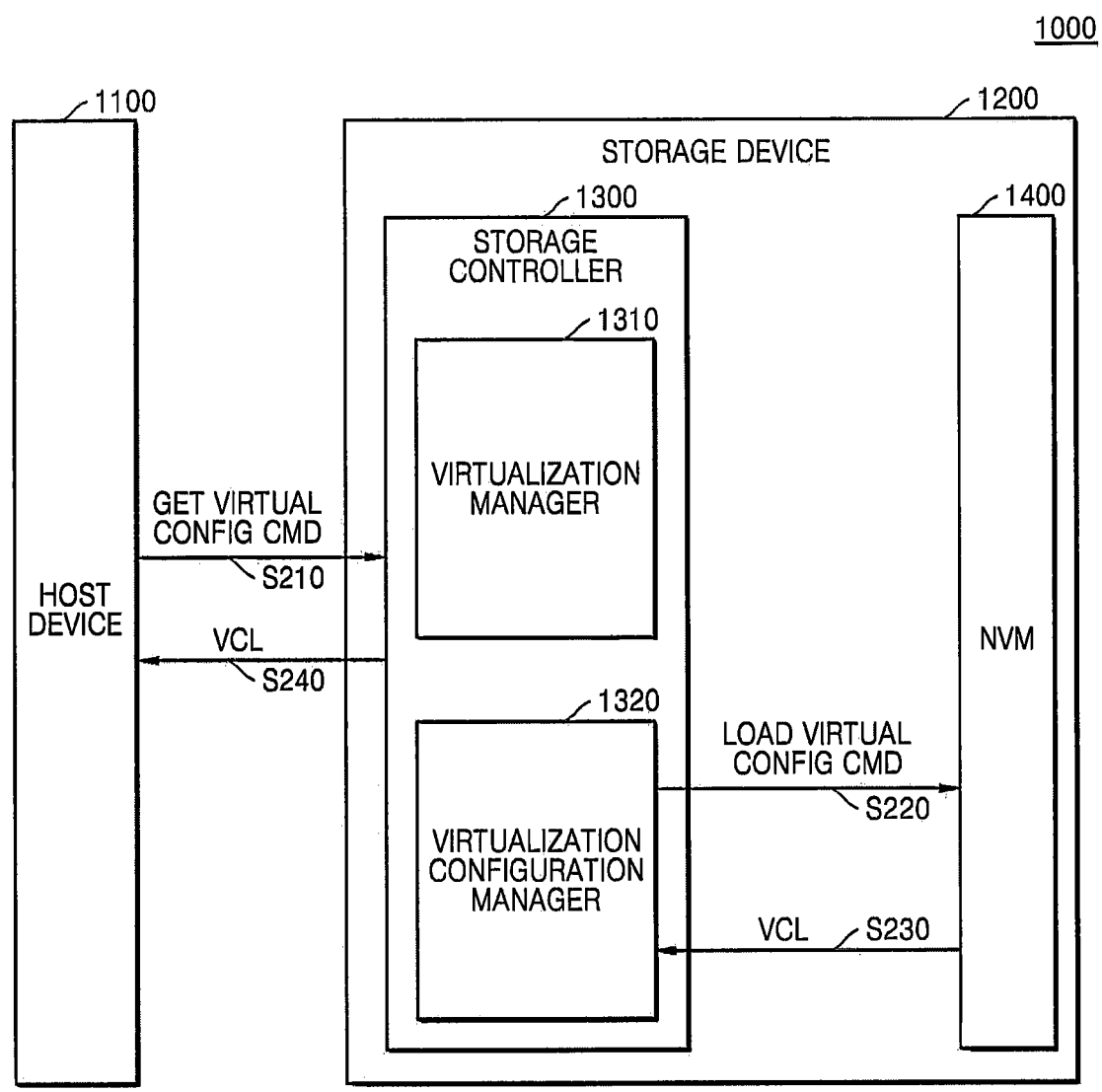
FIG. 5 is a diagram illustrating an operating method of a storage system according to some embodiments.

FIG. 5 is a diagram illustrating an operating method of a storage system according to some embodiments.

For brevity of the drawing, only the virtualization manager 1310 and the virtualization configuration manager 1320 of the storage controller 1300 are shown. Referring to FIGS. 1 and 5, in operation S210, the host device 1100 may transmit the virtualization configuration acquisition command to the storage device 1200. The virtualization configuration acquisition command may be a command that requests the virtualization configuration list VCL stored in the storage device 1200. In operation S220, the storage controller 1300 may transmit a virtualization configuration load command to the nonvolatile memory device 1400. The storage controller 1300 may transmit the virtualization configuration load command to the nonvolatile memory device 1400 in response to the virtualization configuration acquisition command. The virtualization configuration load command may be a command for loading the virtualization configuration list VCL stored in the nonvolatile memory device 1400 to the storage controller 1300.

In operation S230, the nonvolatile memory device 1400 may provide the virtualization configuration list VCL to the storage controller 1300. For example, the nonvolatile memory device 1400 may output the virtualization configuration list VCL to the storage controller 1300 in response to the virtualization configuration load command. In some embodiments, when the virtualization configuration list VCL for the plurality of virtual functions VF has already been loaded into buffer memory (not shown) of the storage controller 1300, operations S220 and S230 may be omitted.

In operation S240, the storage device 1200 may transmit the virtualization configuration list VCL to the host device 1100. In some embodiments, the host device 1100 may check the virtualization configuration list VCL received from the storage device 1200. The host device 1100 may recognize the virtualization configuration list VCL for virtual functions set before the reset or power-up based on the virtualization configuration list VCL received from the storage device 1200.

As described above, the storage device 1200 may store the virtualization configuration list VCL for the plurality of virtual functions VF. The storage device 1200 may provide the stored virtualization configuration list VCL to the host device 1100 in response to the virtualization configuration acquisition command.

Figure 6:
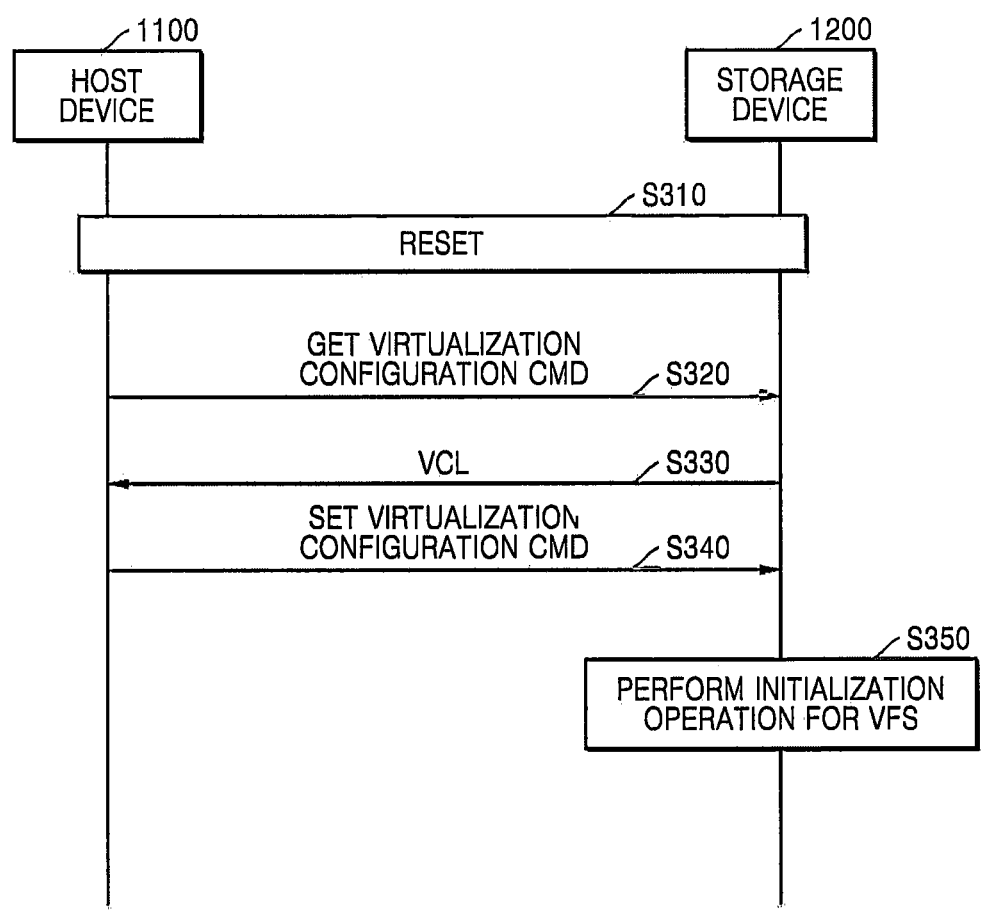
FIG. 6 is a diagram illustrating an operating method of a storage system according to some embodiments.

FIG. 6 is a diagram illustrating an operating method of a storage system according to some embodiments.

Referring to FIGS. 1 and 6, in operation S310, the storage system 1000 may be reset or powered up. When the storage system 1000 is reset or powered up, the host device 1100 may transmit information about the start of initialization to the storage device 1200. In response to the information about the start of initialization, the storage device 1200 may perform an initialization operation. For example, the host device 1100 may transmit a reset signal (or reset command) for the physical function PF related to the plurality of virtual functions VF to the storage device 1200. In response to the reset signal, the storage device 1200 may initialize the configuration for the physical function PF and may initialize the configurations for the plurality of virtual functions VF. The virtualization configuration list VCL may continue to exist or persist in the nonvolatile memory device 1400 even after receiving the reset signal.

In operation S320, the host device 1100 may transmit the virtualization configuration acquisition command to the storage device 1200. For example, the host device 1100 may transmit the virtualization configuration acquisition command to the storage device 1200 to obtain the virtualization configuration list VCL set before the reset.

In operation S330, the storage device 1200 may transmit the virtualization configuration list VCL to the host device 1100. For example, the storage device 1200 may provide the virtualization configuration list VCL stored before the reset to the host device 1100. In some embodiments, the virtualization configuration list VCL may include state data. The state data may indicate a state of the virtualization configuration list VCL. The state data may indicate a previous state or an initial state. The previous state may indicate the virtualization configuration list VCL set by the host device 1100. The initial state may indicate the default virtualization configuration list VCL that is not set by the host device 1100.

In operation S340, the host device 1100 may transmit the virtualization configuration setting command to the storage device 1200. In some embodiments, the host device 1100 may transmit the virtualization configuration list VCL together with the virtualization configuration setting command to the storage device 1200. For example, when the plurality of virtual functions VF are to be set to be different from the virtualization configuration list VCL received through the virtualization configuration acquisition command, the host device 1100 may transmit the virtualization configuration list VCL to the storage device 1200.

In operation S350, the storage device 1200 may perform an initialization operation for virtual functions. The storage device 1200 may perform the initialization operation for virtual functions in response to the virtualization configuration setting command. In some embodiments, the storage device 1200 may set virtual functions based on the virtualization configuration list VCL stored in the nonvolatile memory device 1400. The storage device 1200 may perform an initialization operation for the plurality of virtual functions VF without intervention of the host device 1100 in addition to the virtualization configuration setting command. In setting the plurality of virtual functions VF, the storage device 1200 may receive only one command (i.e., virtualization configuration setting command) and may not receive other commands or data.

In some embodiments, after the initialization operation for virtual functions is completed, the host device 1100 may attach the bound virtual functions to corresponding virtual machines. Each of the virtual machines may store data in the corresponding virtual function and read the stored data.

In some embodiments, the physical function PF may receive a function level reset signal. The physical function PF may perform a reset operation. In addition, all virtual functions VF related to the physical function PF may also perform a reset operation. Due to the reset operation, configuration information of the virtual functions VF may be initialized. In some embodiments, due to the reset operation, the configuration information of the virtual functions VF set by the host device 1100 may be lost.

The storage system 1000 supporting the SR-IOV requires an initialization operation for the plurality of virtual functions VF due to the reset operation for the physical function PF. The storage system 1000 that does not support the automatic setting operation may reset the plurality of virtual functions VF by repeatedly performing operations S115 to S124 of FIG. 3. Referring to FIG. 3, to set the plurality of virtual functions VF, the host device 1100 may repeatedly perform operations S115 to S124. The host device 1100 may perform an initialization operation for the plurality of virtual functions VF by repeatedly performing operations S115 to S124 by as many times as the number of virtual functions. Due to the reset for the physical function PF, the total load on the storage system 1000 may increase by repeatedly performing an initialization operation for the plurality of virtual functions VF. In particular, since the plurality of virtual functions VF are set under control by the host device 1100, the load on the host device 1100 may increase.

However, the storage device 1200 according to some embodiments may continue to store the virtualization configuration list VCL in the nonvolatile memory device 1400. Even after the function level reset signal is received by the physical function PF, the virtualization configuration list VCL stored in the nonvolatile memory device 1400 may be maintained in the storage device 1200. The storage device 1200 according to the inventive concept may perform an automatic setting operation. The storage device 1200 may automatically set the configuration for the plurality of virtual functions VF. Referring to FIG. 6, the host device 1100 may set the plurality of virtual functions VF by performing only operation S340. That is, the host device 1100 may set the plurality of virtual functions VF by only transmitting the virtualization configuration setting command. The storage device 1200 may perform an initialization operation for the plurality of virtual functions VF independently in response to the virtualization configuration setting command.

Accordingly, the number of communications between the host device 1100 and the storage device 1200 may be reduced. The amount of information transmitted and received between the host device 1100 and the storage device 1200 may be reduced. The workload of the host device 1100 may be distributed to the storage device 1200, thereby providing a storage system having improved processing speed and throughput.

Figure 7:
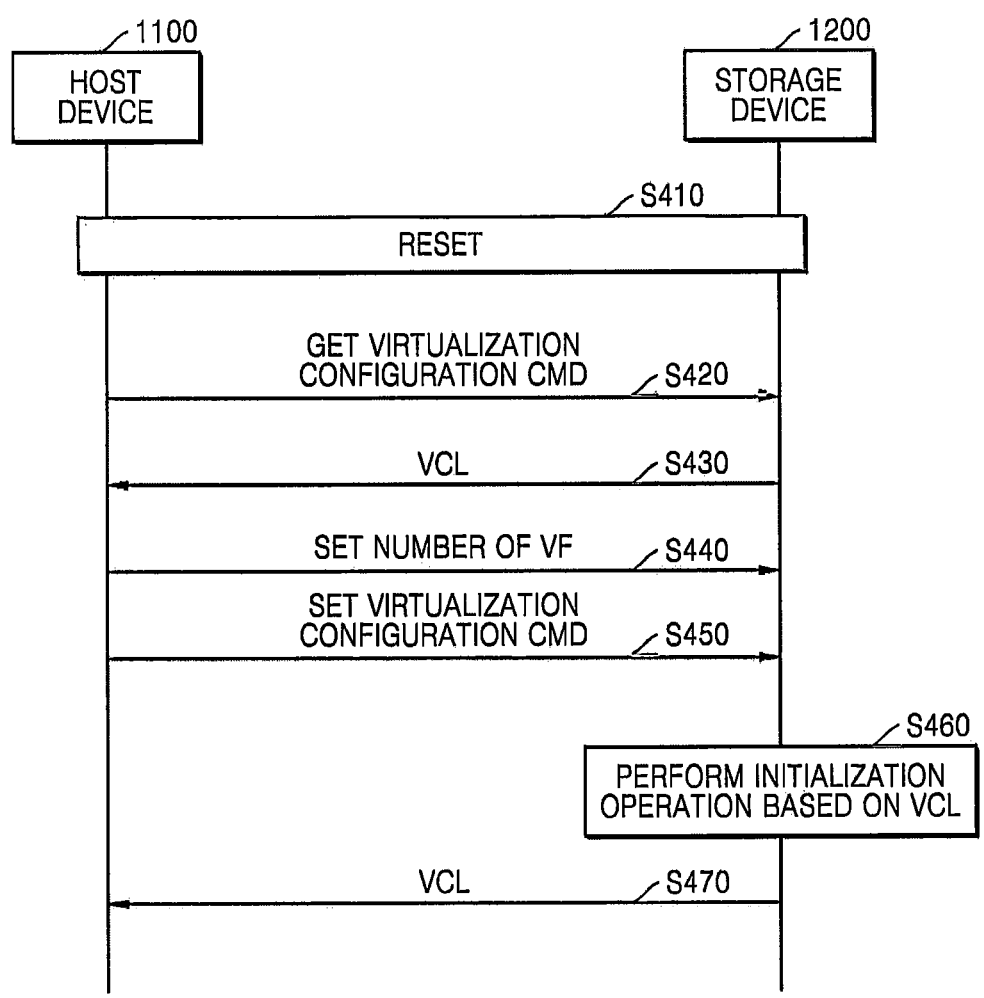
FIG. 7 is a diagram illustrating an operating method of a storage system according to some embodiments.

FIG. 7 is a diagram illustrating an operating method of a storage system according to some embodiments.

For convenience of explanation, detailed description of the operations described above is omitted. Referring to FIGS. 1 and 7, in operation S410, the storage system 1000 may be reset or powered up. In operation S420, the host device 1100 may transmit the virtualization configuration acquisition command to the storage device 1200. In operation S430, the storage device 1200 may transmit the virtualization configuration list VCL to the host device 1100.

In operation S440, the host device 1100 may set the number of virtual functions. The host device 1100 may transmit the number of virtual functions to the storage device 1200. In some embodiments, the storage device 1200 may transmit device information including information on the maximum number of virtual functions to the host device 1100. The host device 1100 may set the number of virtual functions within the maximum number of virtual functions.

In operation S450, the host device 1100 may transmit the virtualization configuration setting command to the storage device 1200. The virtualization configuration setting command may be a command for requesting the storage device 1200 to automatically perform an initialization operation for virtual functions based on the virtualization configuration list VCL.

In some embodiments, the host device 1100 may transmit the virtualization configuration setting command to the storage device 1200 together with the virtualization configuration list VCL. The virtualization configuration list VCL transmitted by the host device 1100 may be different from the virtualization configuration list VCL in operation S430. When the configurations for the plurality of virtual functions VF are to be set to be different from the configurations for the plurality of virtual functions VF set before operation S410, the host device 1100 may transmit the virtualization configuration setting command and the virtualization configuration list VCL to the storage device 1200.

In operation S460, the storage device 1200 may perform an initialization operation based on the virtualization configuration list VCL. The storage device 1200 may receive the virtualization configuration setting command. The storage device 1200 may perform an initialization operation for the plurality of virtual functions VF based on the virtualization configuration list VCL in response to the virtualization configuration setting command.

According to some embodiments, the storage device 1200 may allocate resources to the plurality of virtual functions VF. The storage device 1200 may perform an online operation for the plurality of virtual functions VF. The storage device 1200 may perform a binding operation for the plurality of virtual functions VF. The storage device 1200 may perform a namespace attachment operation for the plurality of virtual functions VF. The storage device 1200 may set performance information for the plurality of virtual functions VF.

In some embodiments, the storage device 1200 may perform an initialization operation for the plurality of virtual functions VF based on the virtualization configuration list VCL stored in the nonvolatile memory device 1400. In some embodiments, the storage device 1200 may perform an initialization operation for the plurality of virtual functions VF based on the virtualization configuration list VCL received together with the virtualization configuration setting command. In some embodiments, the storage device 1200 may perform an initialization operation for the plurality of virtual functions VF based on the default virtualization configuration list. The detailed description related thereto is described with reference to FIG. 10. The storage device 1200 may set the plurality of virtual functions VF without intervention of the host device 1100.

In operation S470, the storage device 1200 may transmit the virtualization configuration list VCL to the host device 1100. The storage device 1200 may perform operation S460 (i.e., initialization operation for the plurality of virtual functions VF) and may generate or update the virtualization configuration list VCL. The storage device 1200 may store the virtualization configuration list VCL in the nonvolatile memory device 1400. The storage device 1200 may transmit the virtualization configuration list VCL to the host device 1100 after the initialization operation for the plurality of virtual functions VF is completed. The storage device 1200 may transmit the virtualization configuration list VCL to the host device 1100 to inform that the initialization operation for the plurality of virtual functions VF has been completed.

The storage device 1200 according to some embodiments may perform an initialization operation for the plurality of virtual functions VF in response to one command received from the host device 1100, that is, the virtualization configuration setting command. The storage device 1200 may perform an initialization operation for the plurality of virtual functions VF based on the previously stored virtualization configuration list VCL without control of the host device 1100. The storage device 1200 may perform an initialization operation for the plurality of virtual functions VF. The storage device 1200 may perform an initialization operation for all of the plurality of virtual functions VF through one command received from the host device 1100.

Figure 8:
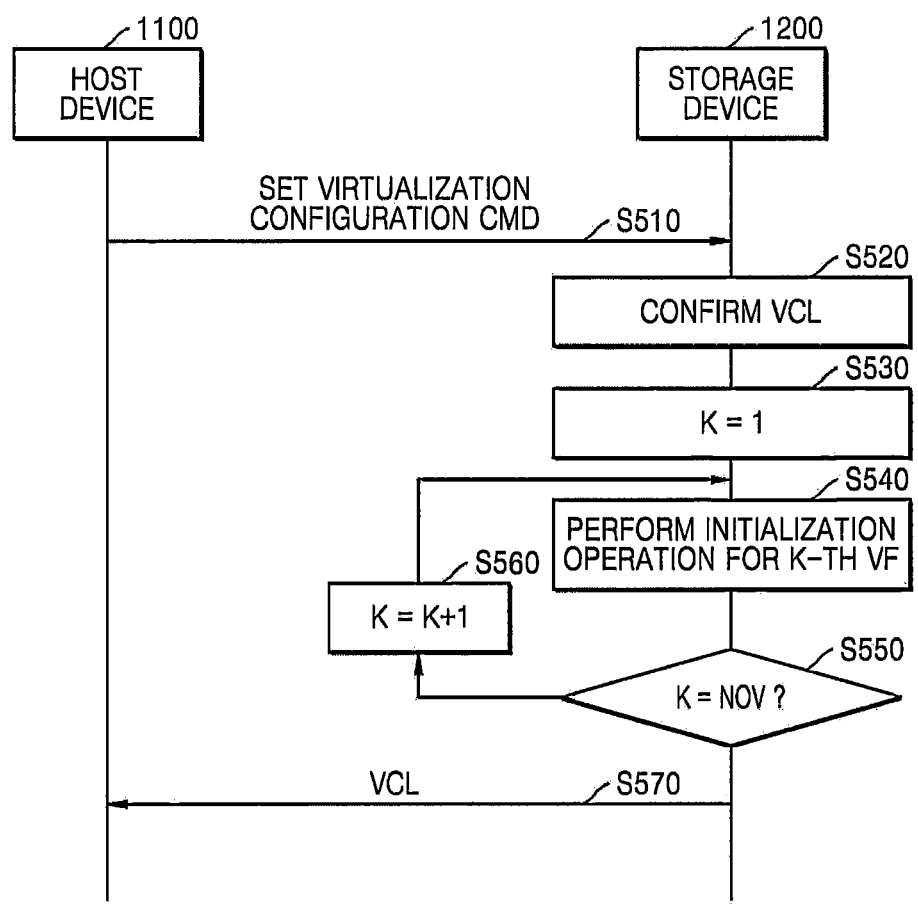
FIG. 8 is a diagram illustrating an operating method of a storage system according to some embodiments.

FIG. 8 is a diagram illustrating an operating method of a storage system according to some embodiments.

Referring to FIGS. 1 and 8, in operation S510, the host device 1100 may transmit the virtualization configuration setting command to the storage device 1200. The storage device 1200 may receive the virtualization configuration setting command from the host device 1100. The virtualization configuration setting command may include mode data. The mode data may indicate any one of a previous mode, a new mode, and/or a default mode.

In some embodiments, the host device 1100 may transmit the virtualization configuration setting command including mode data indicating a new mode. When the mode data included in the virtualization configuration setting command indicates a new mode, the host device 1100 may provide the virtualization configuration list VCL to the storage device 1200 together with the virtualization configuration setting command. That is, the host device 1100 may transmit the virtualization configuration setting command and the virtualization configuration list VCL to the storage device 1200.

The virtualization configuration list VCL transmitted by the host device 1100 may be different from the virtualization configuration list VCL received from the storage device 1200 in response to the virtualization configuration acquisition command. The virtualization configuration list VCL transmitted by the host device 1100 may be transmitted when the host device 1100 sets the configurations for the plurality of virtual functions VF as being different from the configurations for the plurality of virtual functions VF set before the reset. When the plurality of virtual functions VF are to be set to be different from the virtualization configuration list VCL received from the storage device 1200 (i.e., different from the virtualization configuration list stored in the storage device 1200) through the virtualization configuration acquisition command, the host device 1100 may generate and transmit the virtualization configuration list VCL to the storage device 1200.

In some embodiments, when the host device 1100 transmits the virtualization configuration setting command including mode data indicating a previous mode or a default mode, the host device 1100 may not provide the virtualization configuration list VCL. To set the plurality of virtual functions VF based on the virtualization configuration list VCL stored in the storage device 1200, the host device 1100 may transmit the virtualization configuration setting command including mode data indicating a previous mode to the storage device 1200. The host device 1100 may transmit only the virtualization configuration setting command to the storage device 1200 without providing the virtualization configuration list VCL.

To set the plurality of virtual functions VF based on the default virtualization configuration list (or to distribute resources evenly by the number of virtual functions), the host device 1100 may transmit the virtualization configuration setting command to the storage device 1200 including mode data indicating a default mode. The host device 1100 may transmit the virtualization configuration setting command to the storage device 1200 without providing the virtualization configuration list VCL. The default virtualization configuration list may be a preset virtualization configuration list. The default virtualization configuration list may be a virtualization configuration list VCL in which resources are evenly distributed according to the number of virtual functions.

In operation S520, the storage device 1200 may confirm a virtualization configuration list. The storage device 1200 may receive the virtualization configuration setting command. The storage device 1200 may confirm the virtualization configuration list based on the virtualization configuration setting command. The storage device 1200 may determine the virtualization configuration list to be used in an initialization operation in response to mode data included in the virtualization configuration setting command.

In operation S530, variable K may be set to 1. For example, the variable K is used to describe repetition of an initialization operation for the plurality of virtual functions VF, and does not limit the scope of the inventive concept.

In operation S540, the host device 1100 may perform an initialization operation for the Kth virtual function among the plurality of virtual functions VF. The storage device 1200 may perform an initialization operation for the plurality of virtual functions VF based on corresponding configuration entries included in the virtualization configuration list VCL in response to the virtualization configuration setting command.

In operation S550, the host device 1100 may determine whether the variable K is the number of virtual functions NOV. The storage device 1200 performs operation S560 when the variable K is not the number of virtual functions NOV, and performs operation S570 when the variable K is the number of virtual functions NOV. In operation S560, the host device 1100 increases the variable K by 1. Afterwards, the host device 1100 performs operation S540.

In some embodiments, the storage device 1200 may not receive a command other than the virtualization configuration setting command from the host device 1100 while performing an initialization operation. That is, the storage device 1200 may perform an initialization operation for the plurality of virtual functions VF independently through one virtualization configuration setting command.

In operation S570, the storage device 1200 may transmit the virtualization configuration list VCL to the host device 1100. The storage device 1200 may perform an initialization operation for virtual functions, and may provide the virtualization configuration list VCL including configuration information of the virtual functions set accordingly to the host device 1100. By providing the virtualization configuration list VCL to the host device 1100, the storage device 1200 may inform the host device 1100 of the result of the storage device 1200 setting the plurality of virtual functions VF independently.

As described above, the storage device 1200 may support SR-IOV setting (or setup) in various environments such as reset. The storage device 1200 may automatically set the plurality of virtual functions VF in response to the virtualization configuration setting command. The storage device 1200 may perform a task of the host device 1100 on behalf of the host device 1100, thereby providing a host offloading effect.

Figure 9:
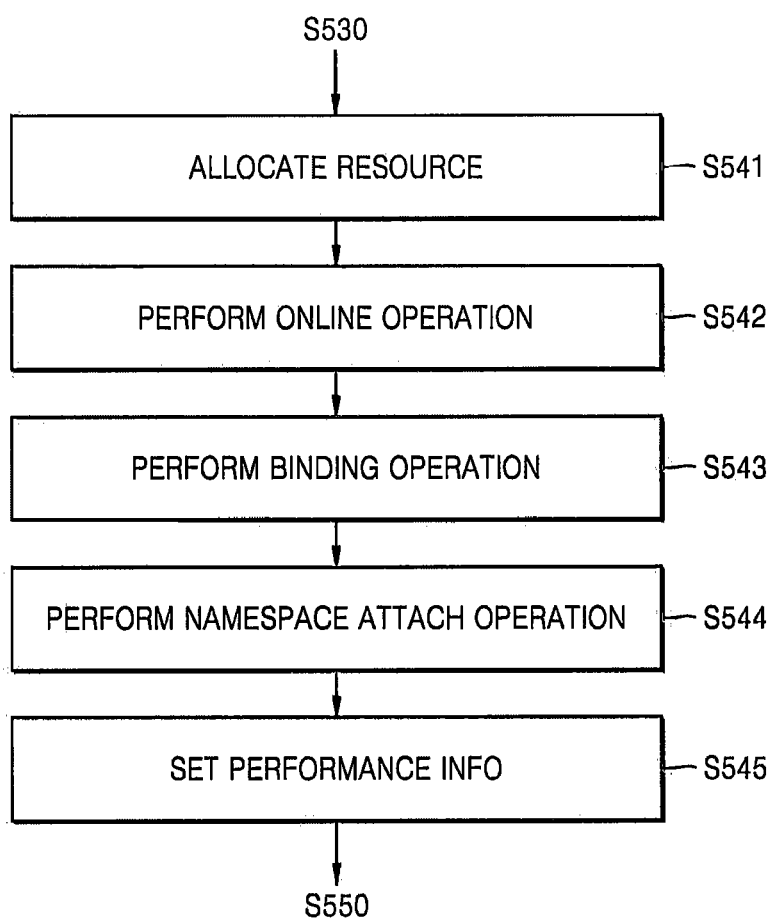
FIG. 9 is a flowchart showing operation S540 of FIG. 8 in more detail.

FIG. 9 is a flowchart showing operation S540 of FIG. 8 in more detail.

The initialization operation for each of the plurality of virtual functions VF of the storage device 1200 is described with reference to FIG. 9. Referring to FIGS. 1, 8, and 9, operation S540 may include operations S541 to S545. The storage device 1200 may perform an initialization operation for the plurality of virtual functions VF based on the virtualization configuration list VCL in response to the virtualization configuration setting command. In operation S541, the storage device 1200 may allocate resources. The storage device 1200 may allocate resources to the Kth virtual function based on the virtualization configuration list VCL.

According to some embodiments, the storage device 1200 may set a virtual queue for the Kth virtual function. The storage device 1200 may set the number of virtual queues of the Kth virtual function based on the virtualization configuration list VCL, without receiving the virtualization management command including information on the number of virtual queues from the host device 1100.

In some embodiments, the storage device 1200 may set a virtual interrupt for the Kth virtual function. The storage device 1200 may set the number of virtual interrupts for the Kth virtual function based on the virtualization configuration list VCL, without receiving the virtualization management command including information on the number of virtual interrupts from the host device 1100.

In operation S542, the storage device 1200 may perform an online operation. The storage device 1200 may set a state of the Kth virtual function based on the virtualization configuration list VCL. For example, each of the virtual functions may have an online state or an offline state. The storage device 1200 may set the Kth virtual function to an online state. The storage device 1200 may set the state of the Kth virtual function to an online state based on the virtualization configuration list VCL, without receiving the virtualization management command from the host device 1100.

In operation S543, the storage device 1200 may perform a binding operation. The storage device 1200 may set whether to bind the Kth virtual function based on the virtualization configuration list VCL. The storage device 1200 may bind the Kth virtual function based on the virtualization configuration list VCL without receiving a command from the host device 1100.

In operation S544, the storage device 1200 may perform a namespace attachment operation. For example, the storage device 1200 may attach the Kth virtual function to a corresponding namespace among the plurality of namespaces based on the virtualization configuration list VCL. The storage device 1200 may attach the Kth virtual function to the corresponding namespace based on the virtualization configuration list VCL, without receiving a namespace attachment command from the host device 1100.

Figure 10:
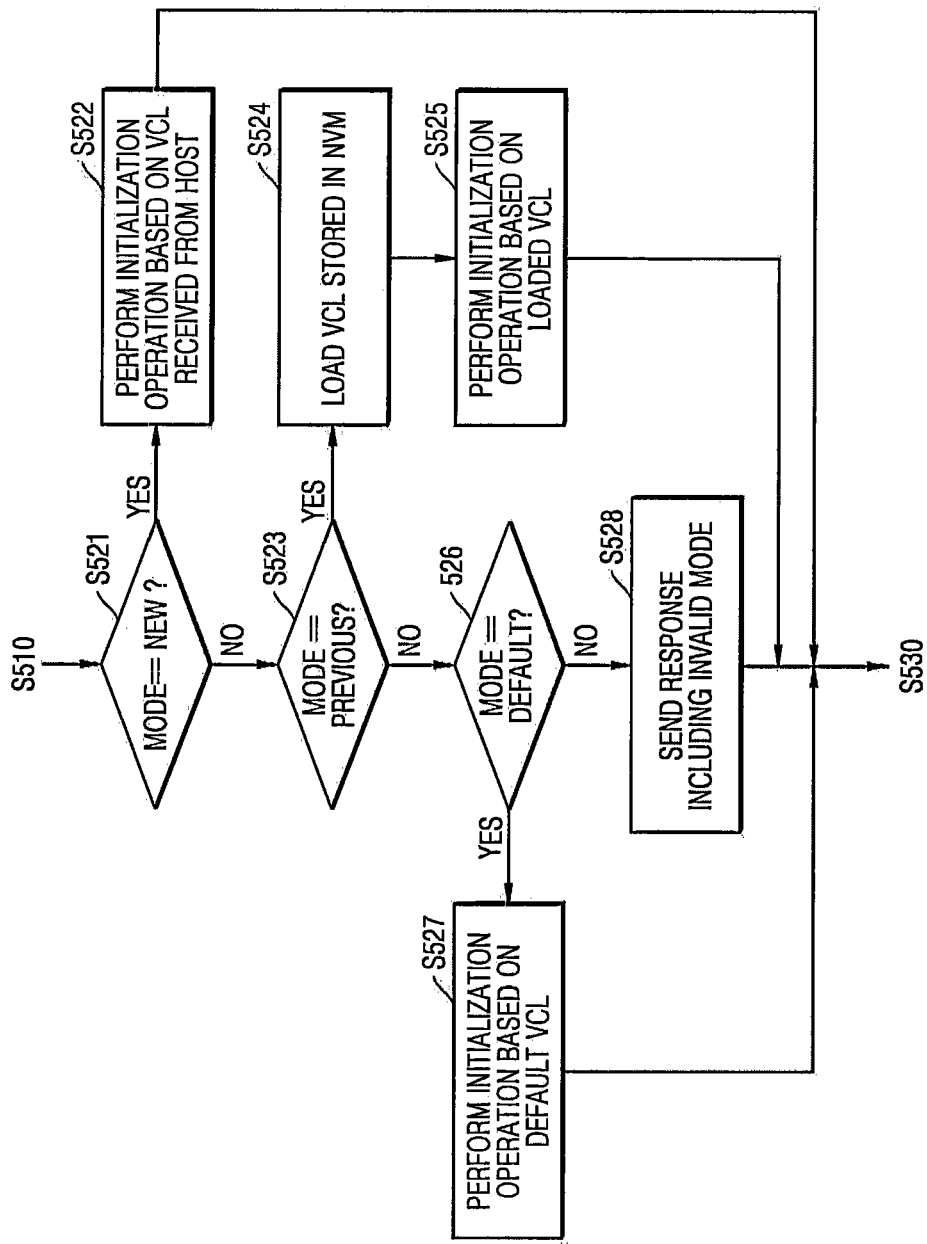
FIG. 10 is a flowchart showing operation S520 of FIG. 8 in more detail.

In operation S545, the storage device 1200 may set performance information. The storage device 1200 may set performance information for the Kth virtual function based on the virtualization configuration list VCL. The storage device 1200 may set the performance information for the Kth virtual function based on the virtualization configuration list VCL without receiving the performance information from the host device 1100. The storage device 1200 may set a quality of service (QOS) based on the virtualization configuration list VCL. FIG. 10 is a flowchart showing operation S520 of FIG. 8 in more detail.

Referring to FIGS. 8 and 10, the storage device 1200 may confirm the virtualization configuration list VCL to be used in an initialization operation. Operation S520 may include operations S521 to S528.

In operation S521, the storage device 1200 may determine whether the mode data indicates a new mode. For example, the storage device 1200 may determine whether the mode data included in the virtualization configuration setting command indicates a new mode. The storage device 1200 performs operation S522 when the mode data indicates a new mode, and performs operation S523 when the mode data does not indicate a new mode.

In operation S522, the storage device 1200 may perform an initialization operation based on the virtualization configuration list VCL received from the host device 1100. When the mode data of the virtualization configuration setting command indicates a new mode, the storage device 1200 may perform an initialization operation based on the virtualization configuration list VCL received from the host device 1100. The storage device 1200 may set the plurality of virtual functions VF based on the virtualization configuration list VCL received from the host device 1100 together with the virtualization configuration command instead of the virtualization configuration list VCL stored in the nonvolatile memory device 1400.

In operation S523, the storage device 1200 may determine whether the mode data indicates a previous mode. For example, the storage device 1200 may determine whether the mode data included in the virtualization configuration setting command indicates a previous mode. The storage device 1200 performs operation S524 when the mode data indicates a previous mode, and performs operation S526 when the mode data does not indicate a previous mode.

In operation S524, the storage device 1200 may load the virtualization configuration list VCL stored in the nonvolatile memory device 1400. For example, the virtualization configuration manager 1320 may transmit the virtualization configuration load command to the nonvolatile memory device 1400 in response to the virtualization configuration setting command including the mode data indicating a previous mode. The virtualization configuration manager 1320 may receive the virtualization configuration list VCL from the nonvolatile memory device 1400.

In operation S525, the storage device 1200 may perform an initialization operation based on the virtualization configuration list VCL loaded from the nonvolatile memory device 1400. When the mode data of the virtualization configuration setting command indicates a previous mode, the storage device 1200 may perform an initialization operation based on the virtualization configuration list VCL stored in the nonvolatile memory device 1400. The storage device 1200 may set the plurality of virtual functions VF as set before the reset or power-up.

In operation S526, the storage device 1200 may determine whether the mode data indicates a default mode. For example, the storage device 1200 may determine whether the mode data included in the virtualization configuration setting command indicates a default mode. The storage device 1200 performs operation S527 when the mode data indicates a default mode, and performs operation S528 when the mode data does not indicate a default mode.

In operation S527, the storage device 1200 may perform an initialization operation based on the default virtualization configuration list. The storage device 1200 may evenly distribute resources to the virtual functions according to the number of virtual functions. The storage device 1200 may set virtual functions to a preset value.

In operation S528, the storage device 1200 may transmit a response including a state indicating an invalid mode to the host device 1100. For example, the storage device 1200 may notify the host device 1100 that the mode data included in the virtualization configuration setting command indicates an invalid mode. For example, the storage device 1200 may transmit a completion entry with a state value indicating an invalid mode to the host device 1100.

Figure 11:
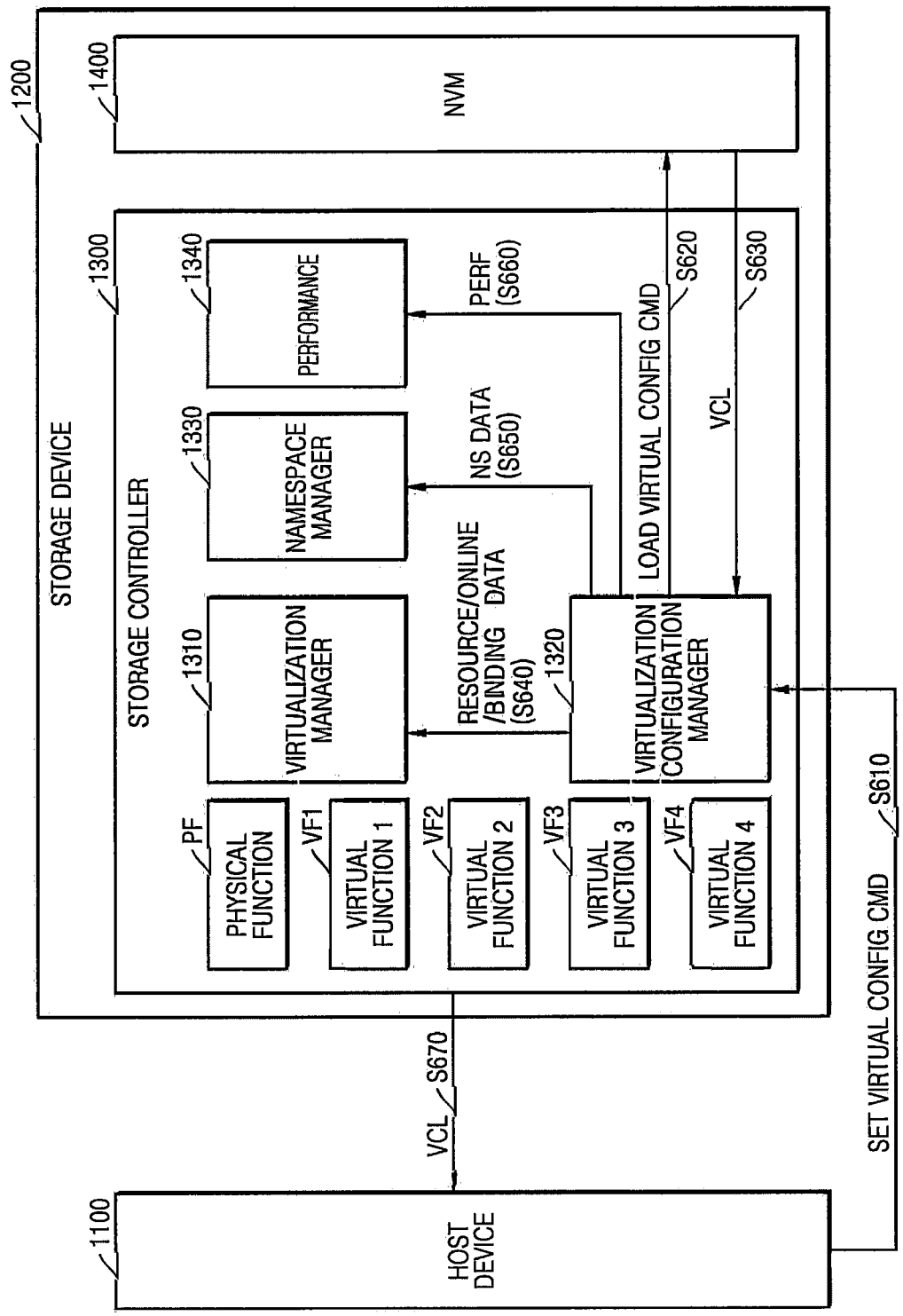
FIG. 11 is a diagram illustrating an operating method of a storage system according to some embodiments.

FIG. 11 is a diagram illustrating an operating method of a storage system according to some embodiments.

For convenience of explanation, detailed description of the operations described above is omitted. It is assumed that the mode data included in the virtualization configuration command indicates a previous mode. Referring to FIGS. 1 and 11, the storage controller 1300 may further include a namespace manager 1330 and a performance manager 1340. The namespace manager 1330 may attach namespaces to or detach namespaces from the corresponding physical function and virtual functions. The performance manager 1340 may manage the performance of the physical function and virtual functions based on performance information received from the host device 1100.

In operation S610, the host device 1100 may transmit the virtualization configuration setting command to the storage device 1200. The virtualization configuration manager 1320 may receive the virtualization configuration setting command. The virtualization configuration manager 1320 may check the mode data included in the virtualization configuration setting command. The virtualization configuration manager 1320 may determine that the mode data indicates a previous mode. In operation S620, the virtualization configuration manager 1320 may transmit the virtualization configuration load command to the nonvolatile memory device 1400 in response to the virtualization configuration setting command. In operation S630, the nonvolatile memory device 1400 may transmit the stored virtualization configuration list VCL to the virtualization configuration manager 1320. The virtualization configuration manager 1320 may receive the virtualization configuration list VCL from the nonvolatile memory device 1400.

In operation S640, the virtualization configuration manager 1320 may transmit resource data, online data, and binding data from the virtualization configuration list VCL to the virtualization manager 1310. The virtualization manager 1310 may receive the resource data, the online data, and the binding data. The virtualization manager 1310 may set the plurality of virtual functions VF based on the resource data, the online data, and the binding data. The virtualization manager 1310 may allocate resources to the plurality of virtual functions VF based on the resource data. The virtualization manager 1310 may set the state of the plurality of virtual functions VF based on the online data. The virtualization manager 1310 may set the plurality of virtual functions VF to an online state based on the online data. The virtualization manager 1310 may set whether to bind the plurality of virtual functions VF based on the binding data.

In operation S650, the virtualization configuration manager 1320 may transmit namespace data to the namespace manager 1330. The virtualization configuration manager 1320 may provide the namespace data from the virtualization configuration list to the namespace manager 1330. The namespace manager 1330 may attach each of the plurality of virtual functions VF to the corresponding namespace based on the namespace data.

In operation S660, the virtualization configuration manager 1320 may transmit the performance data to the performance manager 1340. The virtualization configuration manager 1320 may provide the performance data from the virtualization configuration list to the performance manager 1340. The performance manager 1340 may set performance information for the plurality of virtual functions VF based on the performance data.

In step S670, the virtualization configuration manager 1320 may transmit the virtualization configuration list VCL to the host device 1100. The virtualization configuration manager 1320 may provide the virtualization configuration list VCL to the host device 1100 after setting the plurality of virtual functions VF based on the virtualization configuration list VCL stored in the nonvolatile memory device 1400 is completed. The host device 1100 may receive the virtualization configuration list VCL from the storage device 1200. The host device 1100 may receive the virtualization configuration list VCL, and may recognize that the storage device 1200 has completed an initialization operation for virtual functions.

Figure 12:
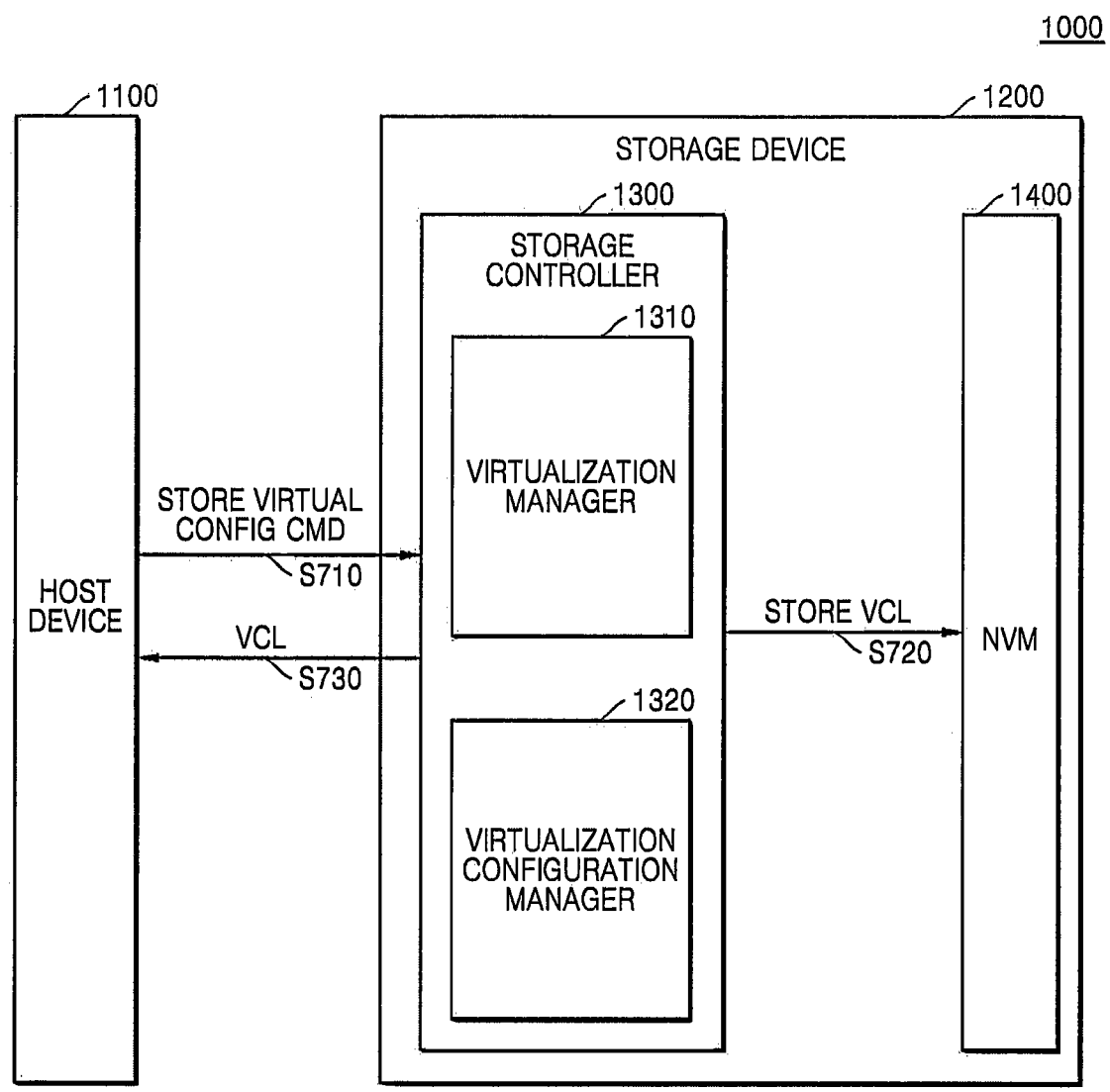
FIG. 12 is a diagram illustrating an operating method of a storage system according to some embodiments.

FIG. 12 is a diagram illustrating an operating method of a storage system according to some embodiments.

For brevity of the drawing, only the virtualization manager 1310 and virtualization configuration manager 1320 of the storage controller 1300 are shown. The storage device 1200 may store the virtualization configuration list VCL in the nonvolatile memory device 1400. In some embodiments, after the initialization operation for the virtual functions is completed, the storage device 1200 may independently store the virtualization configuration list VCL in the nonvolatile memory device 1400. In some embodiments, the storage device 1200 may store the virtualization configuration list VCL in the nonvolatile memory device 1400 in response to a virtualization configuration storage command received from the host device 1100. In FIG. 12, a method by which the storage device 1200 stores the virtualization configuration list in response to the virtualization configuration storage command is described.

Referring to FIGS. 1 and 12, in operation S710, the host device 1100 may transmit the virtualization configuration storage command to the storage device 1200. The virtualization configuration storage command may be a command requesting storage of the virtualization configuration list VCL in the nonvolatile memory device 1400. The storage device 1200 may receive the virtualization configuration storage command.

In operation S720, the storage controller 1300 may store the virtualization configuration list VCL in the nonvolatile memory device 1400 in response to the virtualization configuration storage command. For example, the storage controller 1300 may generate the virtualization configuration list VCL for the plurality of virtual functions VF based on the current state. The storage controller 1300 may store the generated virtualization configuration list VCL in the meta area of the nonvolatile memory device 1400.

In some embodiments, the storage controller 1300 may include the buffer memory (not shown). The virtualization configuration list VCL may be generated from a previous initialization operation and stored in the buffer memory. The storage controller 1300 may store the virtualization configuration list VCL stored in the buffer memory in the nonvolatile memory device 1400.

In operation S730, the storage device 1200 may transmit the virtualization configuration list VCL to the host device 1100. The storage device 1200 may provide the virtualization configuration list VCL to the host device 1100 in response to the virtualization configuration storage command. Depending on the implementation, operation S730 may be omitted.

In some embodiments, the host device 1100 may explicitly instruct the storage device 1200 to store the virtualization configuration list VCL in the nonvolatile memory device 1400 through the virtualization configuration storage command. That is, in response to the virtualization configuration storage command received from the host device 1100, the storage device 1200 may store the virtualization configuration list VCL indicating the current state of the plurality of virtual functions VF in the nonvolatile memory device 1400.

In some embodiments, the host device 1100 may back up the virtualization configuration list VCL to the storage device 1200. Due to unexpected power-down (or reset, etc.) of the storage system 1000, the host device 1100 may lose configuration information of virtual functions, that is, the virtualization configuration list VCL. In this case, the host device 1100 may not return to the state before power-down or reset. However, the host device 1100 according to some embodiments may obtain the virtualization configuration list VCL stored in the storage device 1200 through the virtualization configuration acquisition command. The host device 1100 may use the virtualization configuration list VCL backed up in the storage device 1200. The host device 1100 may return to the state before power-down or reset based on the virtualization configuration list VCL.

Figure 13:
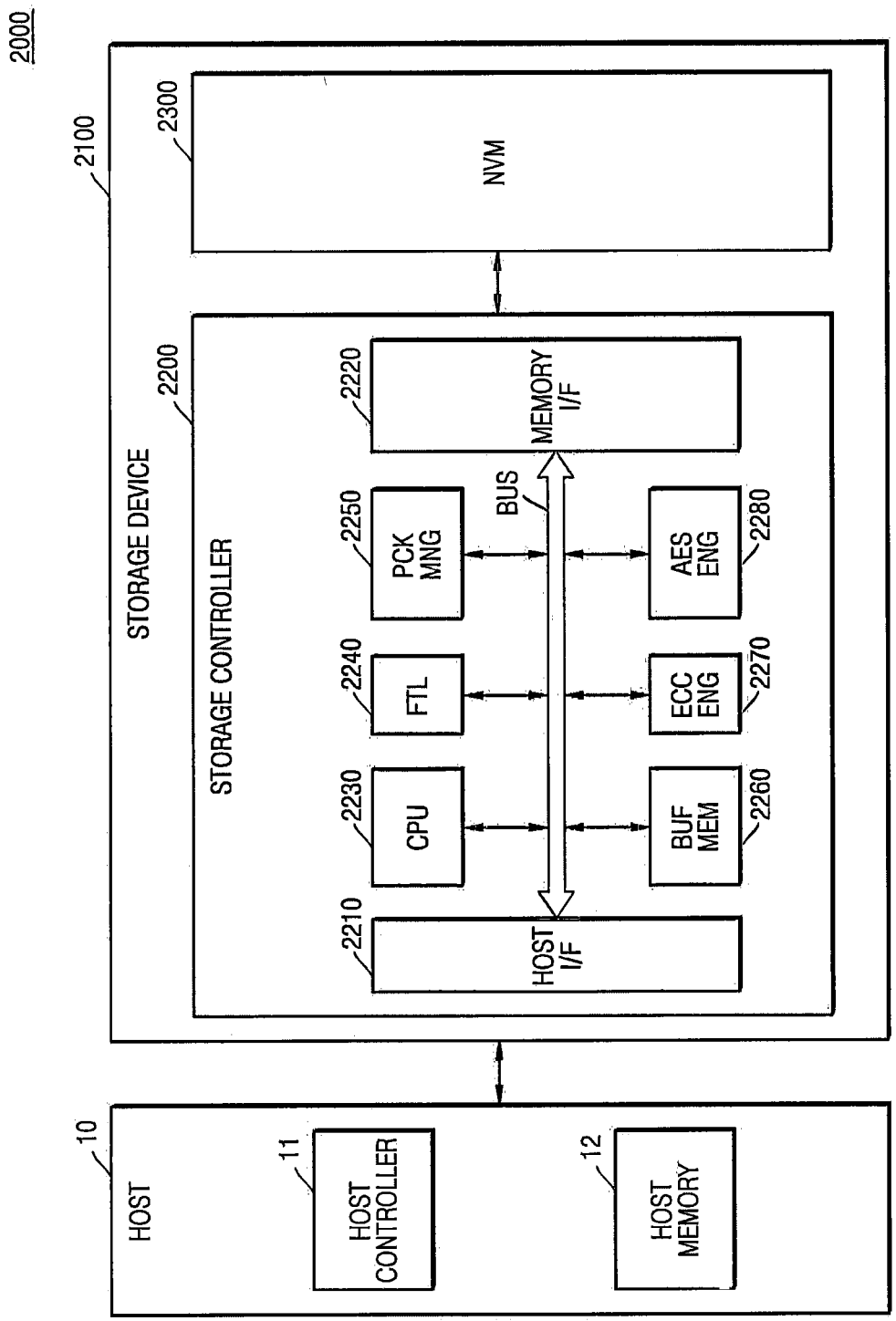
FIG. 13 is a block diagram of a host-storage system according to some embodiments.

FIG. 13 is a block diagram of a host-storage system 2000 according to some embodiments.

The host-storage system 2000 may include a host 10 and a storage device 2100. Additionally, the storage device 2100 may include a storage controller 2200 and a nonvolatile memory 2300. Additionally, according to some embodiments, the host 10 may include a host controller 11 and a host memory 12. The host memory 12 may function as buffer memory for temporarily storing data to be transmitted to the storage device 2100 or data transmitted from the storage device 2100.

The storage device 2100 may include storage media for storing data according to a request from the host 10. As an example, the storage device 2100 may include at least one of an SSD, embedded memory, and removable external memory. When the storage device 2100 is an SSD, the storage device 2100 may be a device that complies with the NVMe standard. When the storage device 2100 is embedded memory or external memory, the storage device 2100 may be a device that complies with the UFS or embedded multi-media card (eMMC) standard. The host 10 and the storage device 2100 may each generate and transmit packets according to the adopted standard protocol.

When the nonvolatile memory 2300 of the storage device 2100 includes flash memory, the flash memory may include a 2D NAND memory array or a 3D (or vertical) NAND (VNAND) memory array. As another example, the storage device 2100 may include various other types of nonvolatile memories. For example, magnetic random access memory (MRAM), spin-transfer torque MRAM, conductive bridging RAM (CBRAM), ferroelectric RAM (FeRAM), phase RAM (PRAM), and resistive RAM (RRAM), and various other types of memory may be applied to the storage device 2100.

According to some embodiments, the host controller 11 and the host memory 12 may be implemented as separate semiconductor chips. In some embodiments, the host controller 11 and host memory 12 may be integrated in the same semiconductor chip. As an example, the host controller 11 may be one of multiple modules included in an application processor, and the application processor may be implemented as a system on chip (SoC). Additionally, the host memory 12 may be embedded memory provided within the application processor, or may be nonvolatile memory or memory module placed outside the application processor.

The host controller 11 may manage an operation of storing data (e.g., recorded data) of a buffer region of the host memory 12 in the nonvolatile memory 2300 or storing data (e.g., read data) of the nonvolatile memory 2300 in the buffer region thereof.

The storage controller 2200 may include a host interface 2210, a memory interface 2220, and a central processing unit (CPU) 2230. In addition, the storage controller 2200 may further include a flash translation layer (FTL) 2240, a packet manager (PCK MNG) 2250, a buffer memory (BUF MEM) 2260, an error correction code (ECC) engine 2270, and an advanced encryption standard (AES) engine 2280. The storage controller 2200 may further include a working memory (not shown) in which the FTL 2240 is loaded, and data recording and reading operations for the nonvolatile memory 2300 may be controlled by the CPU 2230 executing the FTL 2240.

The host interface 2210 may transmit and receive packets to and from the host 10. The packets transmitted from the host 10 to the host interface 2210 may include a command or data to be recorded in the nonvolatile memory 2300, and the packets transmitted from the host interface 2210 to the host 10 may include a response to the command or data read from the nonvolatile memory 2300. The memory interface 2220 may transmit data to be recorded in the nonvolatile memory 2300 to the nonvolatile memory 2300 or may receive data read from the nonvolatile memory 2300. This memory interface 2220 may be implemented to comply with standard conventions such as toggle or open NAND flash interface (ONFI).

The FTL 2240 may perform several functions such as address mapping, wear-leveling, and garbage collection. The address mapping is an operation of changing a logical address received from the host 10 into a physical address used to actually store data in the nonvolatile memory 2300. The wear-leveling is technology for preventing excessive deterioration of a specific block by allowing blocks in the nonvolatile memory 2300 to be used uniformly, and may be implemented through, for example, a firmware technology that balances erase counts of physical blocks. The garbage collection is technology for securing usable capacity in the nonvolatile memory 2300 by erasing the existing block after copying the valid data of the block to a new block.

The packet manager 2250 may generate packets according to the protocol of the interface consulted with the host 10 or may parse various information from the packets received from the host 10. In addition, the buffer memory 2260 may temporarily store data to be recorded in the nonvolatile memory 2300 or data to be read from the nonvolatile memory 2300. The buffer memory 2260 may be a component provided in the storage controller 2200, but may be placed outside the storage controller 2200.

The ECC engine 2270 may perform error detection and correction on the read data read from the nonvolatile memory 2300. More specifically, the ECC engine 2270 may generate parity bits with respect to write data to be written in the nonvolatile memory 2300, and the generated parity bits may be stored in the nonvolatile memory 2300 together with the write data. When reading data from the nonvolatile memory 2300, the ECC engine 2270 may correct errors in the read data using the parity bits read from the nonvolatile memory 2300 together with the read data, and may output the read data with errors corrected.

The AES engine 2280 may perform at least one of an encryption operation and a decryption operation for data input to the storage controller 2200, using a symmetric-key algorithm.

The host 10 may include a plurality of virtual machines as described with reference to FIGS. 1 to 12. The virtual machines included in the host 10 may communicate with corresponding virtual functions of the storage device 2100. The storage device 2100 may include a plurality of virtual functions VF as described with reference to FIGS. 1 to 12. For example, the host interface 2210 may include the plurality of virtual functions VF or the plurality of sub-storage controllers. The storage device 2100 may store the virtualization configuration list in the nonvolatile memory 2300 as described with reference to FIGS. 1 to 12. The storage device 2100 may provide the virtualization configuration list to the host 10 in response to the virtualization configuration acquisition command. The storage device 2100 may perform an automatic setting operation (or an initialization operation) based on the virtualization configuration list.

Figure 14:
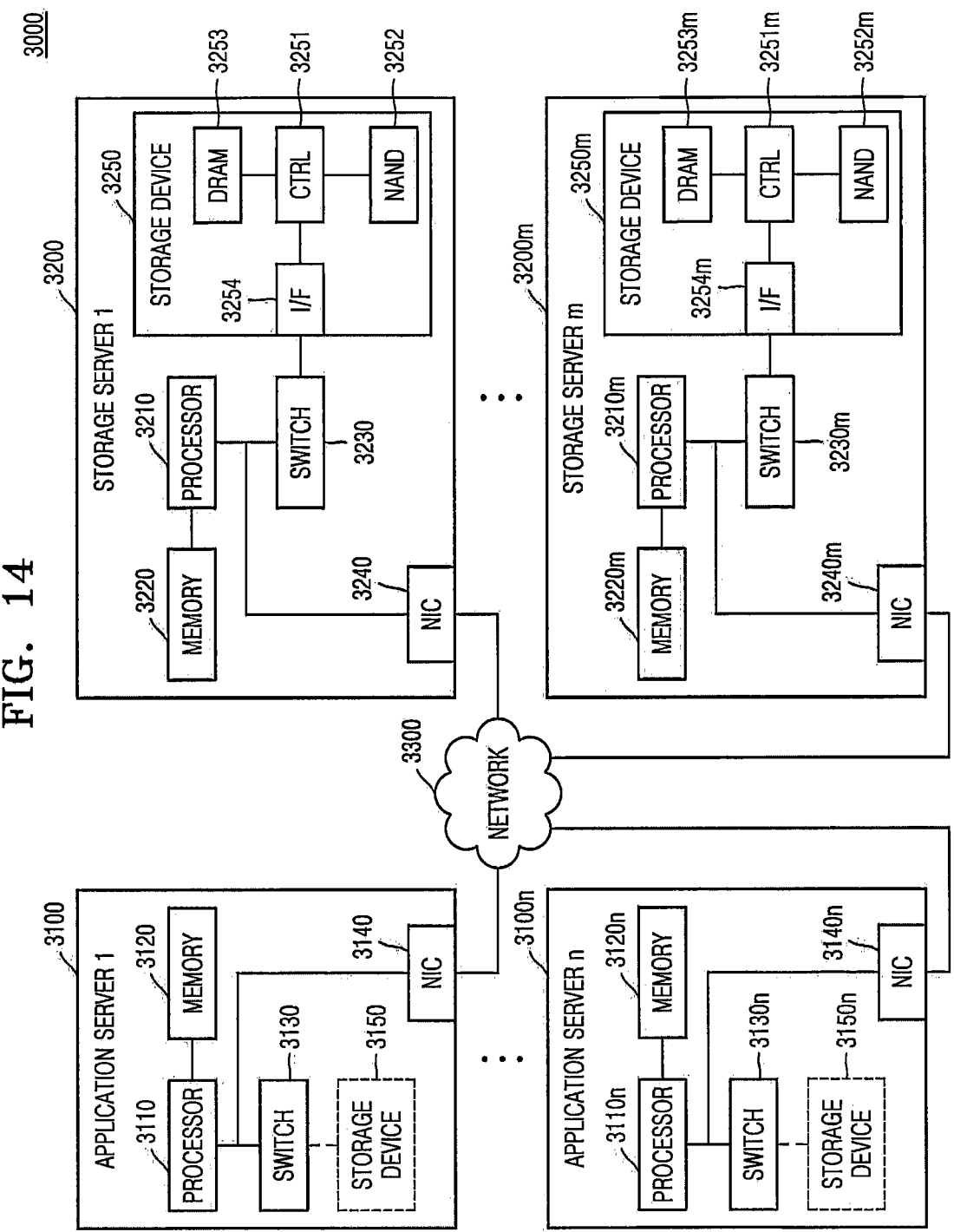
FIG. 14 is a diagram of a data center to which a storage device according to some embodiments is applied.

FIG. 14 is a diagram of a data center to which a storage device according to some embodiments is applied.

Referring to FIG. 14, a data center 3000 is a facility that collects various types of data and provides services, and may be referred to as a data storage center. The data center 3000 may be a system for operating a search engine and a database, and may be a computing system used by companies such as a bank or government agencies. The data center 3000 may include application servers 3100 to 3100n and storage servers 3200 to 3200m. The number of application servers 3100 to 3100n and the number of storage servers 3200 to 3200m may vary depending on some embodiments, and the number of application servers 3100 to 3100n may be different from the number of storage servers 3200 to 3200m.

The application server 3100 or the storage server 3200 may include at least one of a processor 3110 and 3210 and a memory 3120 and 3220. In the storage server 3200, the processor 3210 may control the overall operation of the storage server 3200 and may access the memory 3220 to execute instructions and/or data loaded into the memory 3220. The memory 3220 may include double data rate synchronous dynamic RAM (DDR SDRAM), high bandwidth memory (HBM), hybrid memory cube (HMC), dual in-line memory module (DIMM), optane DIMM, and/or nonvolatile DIMM (NVMDIMM). Depending on some embodiments, the number of processors 3210 and the number of memories 3220 included in the storage server 3200 may vary. In some embodiments, the processor 3210 and the memory 3220 may provide a processor-memory pair. In some embodiments, the number of processors 3210 may be different from the number of memories 3220. The processor 3210 may include a single-core processor or a multi-core processor. The above description of the storage server 3200 may be similarly applied to the application server 3100. Depending on some embodiments, the application server 3100 may not include the storage device 3150. The storage server 3200 may include at least one storage device 3250. The number of storage devices 3250 included in the storage server 3200 may vary depending on some embodiments.

The application servers 3100 to 3100n may communicate with the storage servers 3200 to 3200m through a network 3300. The network 3300 may be implemented using fibre channel (FC) or Ethernet. The FC is a medium used for relatively high-speed data transmission, and may use an optical switch that provides high performance/high availability. Depending on the access method of the network 3300, the storage servers 3200 to 3200m may provide file storage, block storage, or object storage.

In some embodiments, the network 3300 may be a storage-only network, such as a storage area network (SAN). For example, the SAN may be an FC-SAN that uses an FC network and is implemented according to an FC protocol. For another example, the SAN may be an IP-SAN that uses a TCP/IP network and is implemented according to an iSCSI over TCP/IP or Internet SCSI (iSCSI) protocol. In some embodiments, the network 3300 may be a general network such as a TCP/IP network. For example, the network 3300 may be implemented according to protocols such as FC over Ethernet (FCOE), network attached storage (NAS), and NVMe over fabric (NVMe-oF).

Hereinafter, the application server 3100 and the storage server 3200 are mainly described. The description of the application server 3100 may be applied to the other application server 3100n, and the description of the storage server 3200 may be applied to the other storage server 3200m.

The application server 3100 may store data requested to be stored by a user or a client in one of the storage servers 3200 to 3200m through the network 3300. In addition, the application server 3100 may obtain data requested to be read by a user or a client from one of the storage servers 3200 to 3200m through the network 3300. For example, the application server 3100 may be implemented as a web server or a database management system (DBMS).

The application server 3100 may access the memory 3120n or the storage device 3150n included in the other application server 3100n through the network 3300, or may access the memories 3220 to 3220m or the storage devices 3250 to 3250m included in the storage servers 3200 to 3200m through the network 3300. Accordingly, the application server 3100 may perform various operations on data stored in the application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m through the memories 3220 to 3220m of the storage servers 3200 to 3200m, or directly to the memories 3120 to 3120n of the application servers 3100 to 3100n. The data moving through the network 3300 may be encrypted data for security or privacy.

In the storage server 3200, an interface 3254 may provide a physical connection between the processor 3210 and a controller 3251 and a physical connection between a network interconnect (NIC) 3240 and the controller 3251. For example, the interface 3254 may be implemented in a direct attached storage (DAS) method that directly connects the storage device 3250 with a dedicated cable. In addition, for example, the interface (I/F) 3254 may be implemented in various interface methods, such as ATA, SATA, external SATA (e-SATA), SCSI, SAS, PCI, PCIe, NVMe, IEEE 1394, USB, secure digital (SD) card, MMC, UFS, embedded UFS (cUFS), and/or compact flash (CF) card interface, and/or the like.

The storage server 3200 may further include a switch 3230 and the NIC 3240. The switch 3230 may selectively connect the processor 3210 to the storage device 3250 or selectively connect the NIC 3240 to the storage device 3250 under control by the processor 3210.

In some embodiments, the NIC 3240 may include a network interface card, a network adapter, and/or the like.

The NIC 3240 may be connected to the network 3300 through a wired interface, a wireless interface, a Bluetooth interface, an optical interface, and/or the like. The NIC 3240 may include an internal memory, a digital signal processor (DSP), a host bus interface, and/or the like, and may be connected to the processor 3210 and/or the switch 3230 through the host bus interface. The host bus interface may be implemented as one of examples of the interface 3254 described above. In some embodiments, the NIC 3240 may be integrated with at least one of the processor 3210, the switch 3230, and the storage device 3250.

In the storage servers 3200 to 3200m or the application servers 3100 to 3100n, the processor may program or read data by transmitting a command to the storage devices 3150 to 3150n and 3250 to 3250m or the memories 3120 to 3120m and 3220 to 3220m. The data may be error-corrected data through the ECC engine. The data is data processed by data bus inversion (DBI) or data masking (DM), and may include cyclic redundancy code (CRC) information. The data may be encrypted data for security or privacy.

The storage devices 3150 to 3150n and 3250 to 3250m may transmit a control signal and a command/address signal to NAND flash memory devices 3252 to 3252m in response to a read command received from the processor. Accordingly, when data is read from the NAND flash memory devices 3252 to 3252m, a read enable (RE) signal may be input as a data output control signal and may output the data to a DQ bus. A data strobe (DQS) may be generated using the RE signal. The command and the address signal may be latched in the page buffer according to a rising edge or a falling edge of a write enable (WE) signal.

The controller 3251 may control the overall operation of the storage device 3250. In some embodiments, the controller 3251 may include a static random access memory (SRAM). The controller 3251 may write data to the NAND flash memory device 3252 in response to the write command, or may read data from the NAND flash memory device 3252 in response to the read command. For example, the write command and/or read command may be provided from the processor 3210 in the storage server 3200, the processor 3210m in the other storage server 3200m, or the processors 3110 and 3110n in the application servers 3100 and 3100n. A DRAM 3253 may temporarily store or buffer data to be written to the NAND flash memory device 3252 or data read from the NAND flash memory device 3252. In addition, the DRAM 3253 may store metadata. The metadata is user data or data generated by the controller 3251 to manage the NAND flash memory device 3252. The storage device 3250 may include a secure element (SE) for security or privacy.

In some embodiments, the storage devices 3150 to 3150n and 3250 to 3250m may include the plurality of virtual functions VF. The storage devices 3150 to 3150n and 3250 to 3250m may include the virtualization manager and the virtualization configuration manager described with reference to FIGS. 1 to 12. The storage devices 3150 to 3150n and 3250 to 3250m may store the virtualization configuration list in the NAND flash memory device 3252 as described with reference to FIGS. 1 to 12. The storage device 2100 may provide the virtualization configuration list in response to the virtualization configuration acquisition command. The storage device 2100 may perform an automatic setting operation (or an initialization operation) based on the virtualization configuration list.

As described above, the storage device according to the inventive concept may set configurations for all of the plurality of virtual functions VF without intervention of the host device in response to the virtualization configuration setting command. The storage device may automatically set resource allocation, online state setting, binding, namespace setting, and performance information setting in response to one command. Accordingly, the number of communications between the host device and the storage device may be reduced.

While the inventive concept has been particularly shown and described with reference to embodiments thereof, it will be understood that various changes in form and details may be made therein without departing from the spirit and scope of the following claims.

What is claimed is:

1. An operating method of a storage system including a host device and a storage device, the operating method comprising:
   transmitting, from the host device to the storage device, a virtualization configuration acquisition command that indicates a request for a virtualization configuration list that is stored in the storage device;
   transmitting, by the storage device, the virtualization configuration list to the host device in response to the virtualization configuration acquisition command;
   transmitting, from the host device to the storage device, a virtualization configuration setting command; and
   performing, by the storage device, an initialization operation for a plurality of virtual functions of the storage device based on the virtualization configuration list in response to the virtualization configuration setting command.

2. The operating method of claim 1, wherein the performing of the initialization operation for the plurality of virtual functions of the storage device comprises:
   allocating resources to the plurality of virtual functions;
   performing an online operation for the plurality of virtual functions;
   performing a binding operation for the plurality of virtual functions;
   performing a namespace attachment operation for the plurality of virtual functions; and
   setting performance information for the plurality of virtual functions.

3. The operating method of claim 1, further comprising:
   transmitting the virtualization configuration list to the host device from the storage device after the initialization operation for the plurality of virtual functions is completed.

4. The operating method of claim 3, wherein the virtualization configuration list comprises at least one of valid data, resource data, online data, binding data, or a virtual function identifier for the plurality of virtual functions.

5. The operating method of claim 4, wherein the resource data comprises at least one of virtual queue data, virtual interrupt data, namespace data, or performance data.

6. The operating method of claim 1, wherein the storage device is configured to support single root I/O virtualization (SR-IOV).

7. The operating method of claim 1, further comprising:
   transmitting, from the host device to the storage device, a virtualization configuration storage command that indicates a request for storage of the virtualization configuration list; and
   storing, by the storage device, the virtualization configuration list in a nonvolatile memory device included in the storage device in response to the virtualization configuration storage command.

8. The operating method of claim 6, further comprising:
transmitting, by the host device, a reset signal for a physical function related to the plurality of virtual functions; and
initializing, by the storage device, configurations for the physical function and the plurality of virtual functions in response to the reset signal,
wherein the virtualization configuration list persists in a nonvolatile memory device even after receiving the reset signal.

9. The operating method of claim 1, further comprising:
transmitting, from the host device to the storage device, identifiers corresponding to the plurality of virtual functions.

10. The operating method of claim 1, wherein the transmitting of the virtualization configuration setting command to the storage device by the host device comprises:
transmitting, from the host device to the storage device, the virtualization configuration setting command and a first virtualization configuration list.

11. The operating method of claim 10, wherein the first virtualization configuration list is different from a virtualization configuration list received from the storage device in response to the virtualization configuration acquisition command, and
wherein the first virtualization configuration list is transmitted when the host device sets configurations for the plurality of virtual functions different from the configurations for the plurality of virtual functions set before a reset.

12. The operating method of claim 1, further comprising:
transmitting, from the host device to the storage device, a number of virtual functions for a physical function related to the plurality of virtual functions.

13. The operating method of claim 1, wherein the performing the initialization operation comprises:
performing, by the storage device, the initialization operation based on a virtualization configuration list received from the host device when mode data of the virtualization configuration setting command indicates a new mode;
performing, by the storage device, the initialization operation based on the virtualization configuration list stored in a nonvolatile memory device when the mode data of the virtualization configuration setting command indicates a previous mode; and
performing, by the storage device, the initialization operation based on a default virtualization configuration list when the mode data of the virtualization configuration setting command indicates a default mode.

14. An operating method of a storage device, the operating method comprising:
receiving a virtualization configuration setting command from an external host device; and
performing, by the storage device an initialization operation for a plurality of virtual functions of the storage device based on a virtualization configuration list in response to the virtualization configuration setting command,
wherein the storage device does not receive commands other than the virtualization configuration setting command from the external host device while performing the initialization operation.

15. The operating method of claim 14, further comprising:
transmitting the virtualization configuration list to the external host device after the initialization operation,
wherein the virtualization configuration list comprises at least one of valid data, resource data, online data, binding data, or a virtual function identifier for the plurality of virtual functions.

16. The operating method of claim 14, further comprising:
confirming the virtualization configuration list based on mode data included in the virtualization configuration setting command,
wherein the mode data indicates a previous mode, a new mode, or a default mode.

17. The operating method of claim 14, further comprising:
receiving, from the external host device, a virtualization configuration acquisition command that indicates a request for the virtualization configuration list stored in the storage device; and
transmitting the virtualization configuration list to the external host device in response to the virtualization configuration acquisition command.

18. The operating method of claim 14, wherein the performing of the initialization operation for the plurality of virtual functions of the storage device based on the virtualization configuration list comprises:
allocating resources to the plurality of virtual functions;
performing an online operation for the plurality of virtual functions;
performing a binding operation for the plurality of virtual functions;
performing a namespace attachment operation for the plurality of virtual functions; and
setting performance information for the plurality of virtual functions.

19. A storage device comprising:
a nonvolatile memory device; and
a controller configured to control the nonvolatile memory device and communicate with an external host device through an interface channel, wherein the controller is configured to provide a physical function, and a plurality of virtual functions related to the physical function;
a virtualization configuration manager configured to generate a virtualization configuration list of the plurality of virtual functions, store the virtualization configuration list in the nonvolatile memory device, transmit the virtualization configuration list to the external host device in response to a virtualization configuration acquisition command received from the external host device, and transmit the virtualization configuration list to a virtualization manager in response to a virtualization configuration setting command received from the external host device; and
a virtualization manager configured to perform an initialization operation for the plurality of virtual functions based on the virtualization configuration list.

20. The storage device of claim 19, wherein the virtualization manager is further configured to allocate resources to the plurality of virtual functions, perform an online operation for the plurality of virtual functions, perform a binding operation for the plurality of virtual functions, perform a namespace attachment operation for the plurality of virtual functions, and set performance information for the plurality of virtual functions, based on the virtualization configuration list without control by the external host device.

* * * * *